US007409089B2

(12) United States Patent
Simmons et al.

(10) Patent No.: US 7,409,089 B2
(45) Date of Patent: Aug. 5, 2008

(54) WRITING GUIDE FOR A FREE-FORM DOCUMENT EDITOR

(75) Inventors: Alex J. Simmons, Seattle, WA (US); Kentaro Urata, Kirkland, WA (US); Peter Loren Engrav, Seattle, WA (US); Christopher H. Pratley, Seattle, WA (US); Owen C. Braun, Seattle, WA (US); Stuart J. Stuple, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/429,783

(22) Filed: May 8, 2006

(65) Prior Publication Data

US 2006/0257025 A1    Nov. 16, 2006

Related U.S. Application Data

(63) Continuation of application No. 10/186,388, filed on Jun. 28, 2002, now Pat. No. 7,062,090.

(51) Int. Cl.
*G06K 9/00* (2006.01)
*G06K 9/18* (2006.01)
(52) U.S. Cl. .................. 382/186; 382/187; 382/189
(58) Field of Classification Search ............. 382/186, 382/189, 187; 345/173
See application file for complete search history.

(56) References Cited

U.S. PATENT DOCUMENTS

| 4,377,803 | A | 3/1983 | Lotspiech et al. |
| 4,680,804 | A | 7/1987 | Kuzunuki et al. |
| 4,741,045 | A | 4/1988 | Denning |
| 5,517,578 | A | 5/1996 | Altman et al. |
| 5,583,542 | A * | 12/1996 | Capps et al. ............. 345/173 |
| 5,864,636 | A | 1/1999 | Chisaka |
| 6,054,990 | A | 4/2000 | Tran |
| 6,130,962 | A | 10/2000 | Sakurai |
| 6,249,604 | B1 | 6/2001 | Huttenlocher et al. |
| 6,384,815 | B1 | 5/2002 | Huang |
| 6,625,583 | B1 * | 9/2003 | Silverman et al. ......... 705/36 R |
| 6,952,803 | B1 | 10/2005 | Bloomberg et al. |
| 2001/0033694 | A1 | 10/2001 | Goodman et al. |
| 2003/0215145 | A1 | 11/2003 | Shilman et al. |

OTHER PUBLICATIONS

Burr, D.J., "A Normalizing Transformation for Cursive Script Recognition," Proceedings of the 6th International Conference on Pattern Recognition, IEEE, Press, 1982 (pp. 1027-1030).

(Continued)

*Primary Examiner*—Bhavesh Mehta
*Assistant Examiner*—John B Strege
(74) *Attorney, Agent, or Firm*—Perkins Coie LLP

(57) ABSTRACT

Displaying a writing guide for a free-form document editor by detecting electronic ink, classifying the detected ink as corresponding to handwriting or a drawing, and displaying a handwriting guide or a drawing guide in response to classifying the detected ink as handwriting or a drawing, respectively. The writing guides can provide feedback regarding the classification of the detected ink and can be resized as additional ink is detected. The handwriting guide can comprise a writing area, writing guide portion, bullet guide, indent marker, character notches, gesture guide, or sacrificial guide to create meaningful structure within an outline object of an electronic document.

20 Claims, 26 Drawing Sheets

OTHER PUBLICATIONS

Machii, K., et al., "On-Line Text/Drawings Segmentation of Handwritten Patterns," Document Analysis and Recognition, 1993, Proceedings of the Second International Conference, Oct. 20-22, 1993 (pp. 710-713).

Mori, S., et al., "A Handwritten Mechanical Drawing Recognition System," Industrial Applications of Machine Intelligence and Vision, 1989, International Workshop, Apr. 10-12, 1989 (pp. 270-275).

* cited by examiner

1500

1506

402

WRITING GUIDE FOR A FREE-FORM DOCUMENT EDITOR

RELATED PATENT APPLICATIONS

This application is a continuation of U.S. patent application Ser. No. 10/186,388 filed on Jun. 28, 2002, now U.S. Pat. No. 7,062,090 entitled "WRITING GUIDE FOR A FREE-FORM DOCUMENT EDITOR", which application is related to the following co-pending, non-provisional patent applications: U.S. patent application Ser. No. 09/852,799, filed on May 11, 2001, entitled "Serial Storage of Ink and Its Properties" and U.S. patent application Ser. No. 90/430,150 filed on Oct. 29, 1999, entitled "Universal File Format for Digital Rich Ink Data." Both related applications are assigned to the Microsoft Corporation.

This patent application also is related to the following non-provisional patent applications: U.S. patent application Ser. No. 10/186,847, entitled "Method and System for Editing Electronic Ink," U.S. patent application Ser. No. 10/186,874, entitled "Method and System for Selecting Objects on a Display Device," U.S. patent application Ser. No. 10/186,812, entitled "Resolving Document Object Collisions," U.S. patent application Ser. No. 10/186,837, entitled "Space Management for Electronic Documents," U.S. patent application Ser. No. 10/186,865, entitled "System and Method for Automatically Recognizing Electronic Handwriting in an Electronic Document and Converting to Text," U.S. patent application Ser. No. 10/186,820, entitled "Method and System for Designating Data Objects with Designation Tools," and U.S. patent application Ser. No. 10/186,463, entitled "Method and System for Displaying and Linking Ink Objects with Recognized Text and Objects." Those applications and the application herein are all being filed on the same date, Jun. 28, 2002, and are assigned to the Microsoft Corporation.

The subject matter of each related application identified above is fully incorporated herein by reference.

FIELD OF THE INVENTION

The present invention relates to creating electronic documents using a free-form document editor. Particularly, the present invention relates to writing guides that provide a user interface in a free-form document editor.

BACKGROUND OF THE INVENTION

One of the simplest methods of recording and communicating information is the traditional method of writing the information on a piece of paper with a writing instrument such as a pen. Writing information by hand on a piece of paper is inexpensive and can be done quickly and easily with little preparation. The traditional method is also flexible in that a writer generally can write in any format anywhere on the page. One of the limitations with handwritten work is that it is not easily manipulated or transferred to other contexts. In other words, changing or transferring a piece of handwritten script typically requires rewriting the script on another medium.

With the widespread use of personal computers, textual information often is recorded using word processing software running on a personal computer. The advantage of such electronic methods of recording information is that the information can be stored easily and transferred to other remote computing devices and electronic media. Such electronically recorded text also can be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard can be slower and more cumbersome than handwriting. Although recent advances have been made in reducing the size of personal computers, they are still not as portable and easily accessible as traditional pen and paper. Furthermore, traditional pen and paper provide the user with considerable flexibility for editing a document, recording notes in the margin, and drawing figures and shapes. In some instances, a user may prefer to use a pen to mark-up a document rather than to review the document on-screen, because of the ability to freely make notes outside of the confines of the keyboard and mouse interface.

To address the shortcomings of traditional keyboard and mouse interfaces, there have been various attempts to create an electronic tablet that can record handwriting. The electronic tablets typically comprise a free-form document editor for creating free-form documents, which is considered a valuable tool for enabling a user to engage in free-form note taking. The electronic tablets typically also comprise a screen and a handheld device that is similar to a pen. A user can write with the handheld device on the screen of the electronic tablet in a similar manner to traditional pen and paper. The electronic tablet can "read" the strokes of the user's handwriting with the handheld device and recreate the handwriting in electronic form on the screen with "electronic ink." That electronic tablet approach can be employed in a variety of ways, including on a personal computer and on a handheld computing device.

Recently, other computer systems have been developed that provide for more sophisticated creation and manipulation of electronic ink. Those applications (for example, drawing applications associated with Palm and PocketPC operating systems) can permit the capturing and storing of drawings. Those drawings include other properties associated with the ink strokes used to make up the drawings. For instance, line width and color may be stored with the ink. One goal of these systems is to replicate the look and feel of physical ink being applied to a piece of paper. However, physical ink on paper can have significant amounts of information not captured by the electronic collection of coordinates and connecting line segments. Some of this information may include outline structure and type of writing (such as handwriting or drawing).

In spite of the advances in electronic tablets and electronic ink, there are still several limitations with the performance of such electronic handwriting devices. For example, conventional free-form document editors cannot recognize document structure as the user inputs ink strokes on the tablet. Each line of handwriting is converted separately to text and aligned along a left margin of the screen. Accordingly, any indented formatting provided by the user for the ink strokes is lost on conversion to text.

Another problem with conventional free-form document editors is the blind conversion of ink to text. For example, ink can be converted to text and located in the screen in the exact location of the input ink strokes. However, that method merely provides electronic text without linking the text throughout the electronic document. Accordingly, the user cannot revise and edit the electronic text when it is converted in that manner. Additionally, the text cannot always be exported to other application programs such as a word processor application program.

Another problem with conventional free-form document editors is a lack of feedback regarding the type of ink input by the user. The types of ink include handwriting and drawing. The editor may erroneously classify handwriting as a drawing. However, the editor cannot indicate the classification to the user. Accordingly, the user does not know of the error until the user realizes that the ink was not converted to text. By that time, many lines of ink may be erroneously classified, causing excess work by the user to correct the formatting.

Accordingly, there is need in the art for improving handwriting recognition and conversion in free-form electronic documents. A further need exists for providing feedback regarding the free-form document editor's classification of handwritten ink strokes. Additionally, a need exists in the art for guiding the user's ink input to increase text recognition accuracy. A need also exists for allowing a user to input structured formatting for handwriting and for converting the formatting into text usable by other application programs.

SUMMARY OF THE INVENTION

The present invention can provide a writing guide as a user interface for a free-form document editor. The writing guide can inform a user of the editor's classification of ink strokes input by the user and can allow the user to create structured notes within an outline object of the free-form document editor. Additionally, the writing guide can guide a user in building meaningful electronic document structure that can be converted to text and repurposed in other applications with high accuracy.

The writing guide can provide a user interface for creating and extending lines in an outline object. The writing guide can provide visual feedback to both the user and the document editor, confirming that the ink is its own line of handwriting or that the ink is attached to an existing line of handwriting. Additionally, the writing guide can help the user to write in a more controlled fashion. For example, following the writing guide can result in writing in straight lines and not at arbitrary angles. Accordingly, the user can create handwriting having a high degree of recognition.

The present invention can provide two main types of writing guides, a drawing writing guide and a handwriting writing guide (hereinafter a drawing guide and a handwriting guide, respectively). A writing guide can appear on the document editor page as the user begins to input electronic ink strokes onto a tablet. If a writing guide module determines that the ink strokes comprise handwriting writing, then a handwriting guide can be displayed. As the user continues to write and to create more structure, various forms of the handwriting guide can allow the user to create more complex structure within the outline object. For example, writing guides, writing guide portions, bullet writing guides, indent markers, and other writing guides can show the user how to predictably create more complicated and meaningful structure within an outline object. As the outline object increases, the writing guides can indicate the size and shape of each paragraph and can change size to indicate indent levels and multiple line paragraphs.

If the writing guide module determines that the ink strokes comprise a drawing, then a drawing guide can be displayed. The drawing guide can allow multiple ink strokes to be grouped together as a drawing. The drawing guide can indicate that classification to the user and can inform the document editor not to convert the ink strokes to text.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

Figure 1:
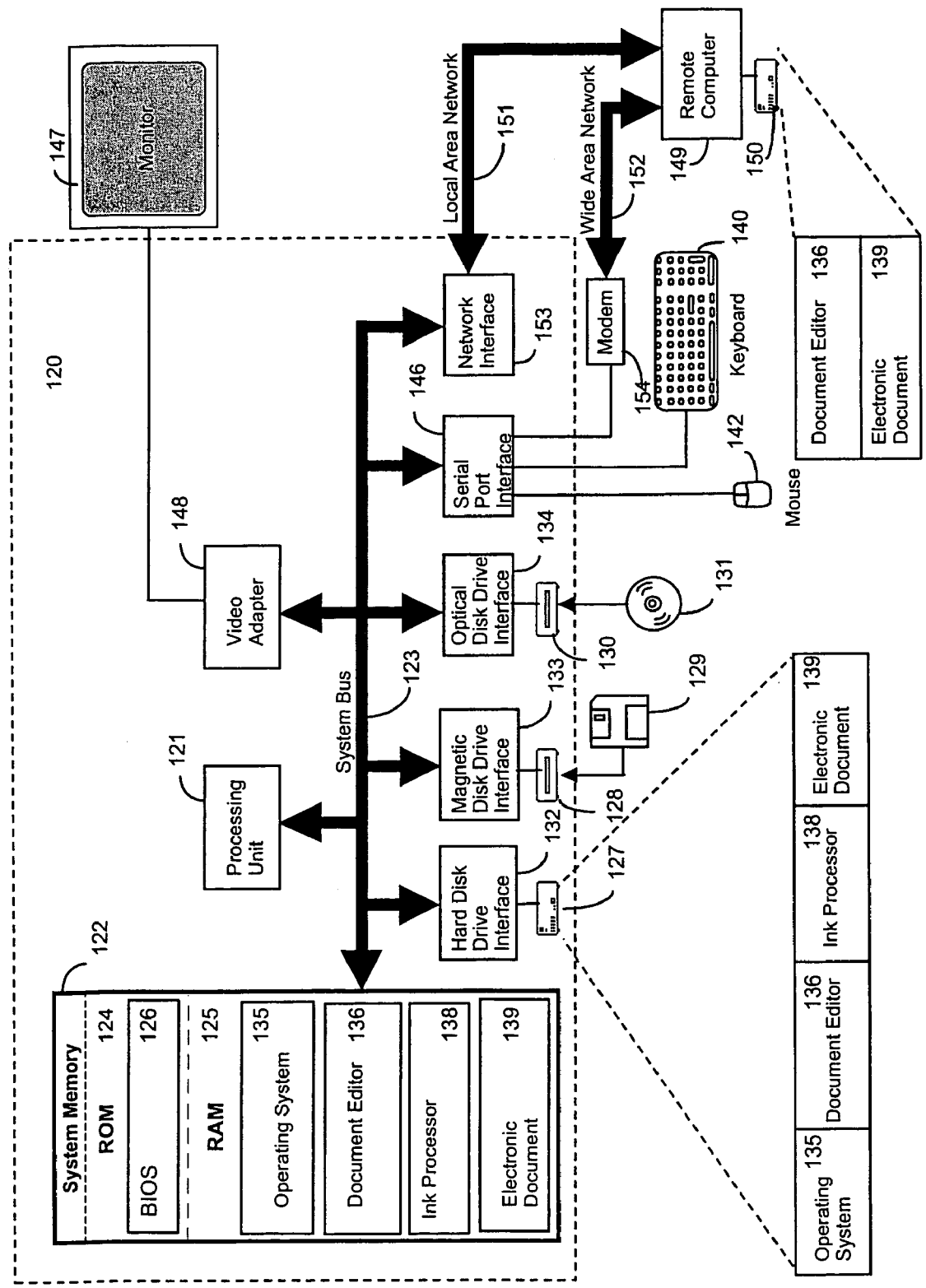
FIG. 1 is a block diagram illustrating an exemplary operating environment for implementation of various embodiments of the present invention.

The present invention can provide a writing guide as a user interface for a free-form document editor to allow creation of an electronic document from handwritten electronic ink. The writing guide can indicate to a user whether the editor has classified ink strokes as handwriting or a drawing. For handwriting, the present invention can present a handwriting guide to the user. The handwriting guide can provide detailed structural information regarding the format structure of the electronic document. For example, the handwriting guide can indicate bullets and indent levels for input handwriting. Additionally, the handwriting guide can indicate whether multiple lines are formatted as one paragraph or as individual lines. For a group of ink strokes classified as a drawing, a drawing guide can be presented. The drawing guide can allow the ink strokes to be formatted and manipulated as a group.

Exemplary embodiments will be described generally in the context of software modules running in a computing environment. The processes and operations performed by the software modules include the manipulation of signals by a client or server and the maintenance of those signals within data structures resident in one or more of local or remote memory storage devices. Such data structures impose a physical organization upon the collection of data stored within a memory storage device and represent specific electrical or magnetic elements. Those symbolic representations are the means used by those skilled in the art of computer programming and computer construction to effectively convey teachings and discoveries to others skilled in the art.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the Figures illustrating the program flow.

Referring now to the drawings, in which like numerals represent like elements, aspects of the present invention and exemplary operating environment will be described.

An Exemplary Operating Environment

FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM, DVD, or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary environment described herein employs the hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for the personal computer 120.

A number of program modules may be stored on the hard disk 127, magnetic disk 129, optical disk 131, ROM 124, or RAM 125, including an operating system 135, a document editor 136, an ink processor 138, and an electronic document 139. Program modules include routines, sub-routines, programs, objects, components, data structures, etc., which perform particular tasks or implement particular abstract data types. Aspects of the present invention may be implemented in the form of a document editor 136 that can operate in concert with the ink processor 138 to edit the electronic document 139. The document editor 136 generally comprises computer-executable instructions for creating and editing electronic documents. The ink processor 138 is generally accessible to the document editor 136, but also can be implemented as an integral part of the document editor 136.

A user may enter commands and information into the personal computer 120 through input devices, such as a keyboard 140 and a pointing device 142. Pointing devices may include a mouse, a trackball, and a stylus or an electronic pen that can be used in conjunction with an electronic tablet. Other input devices (not shown) may include a microphone, joystick, game pad, satellite dish, scanner, or the like. Those and other input devices are often connected to the processing unit 122 through a serial port interface 146 that is coupled to the system bus 123, but may be connected by other interfaces, such as a parallel port, game port, a universal serial bus (USB), or the like. A display device 147 may also be connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. A remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
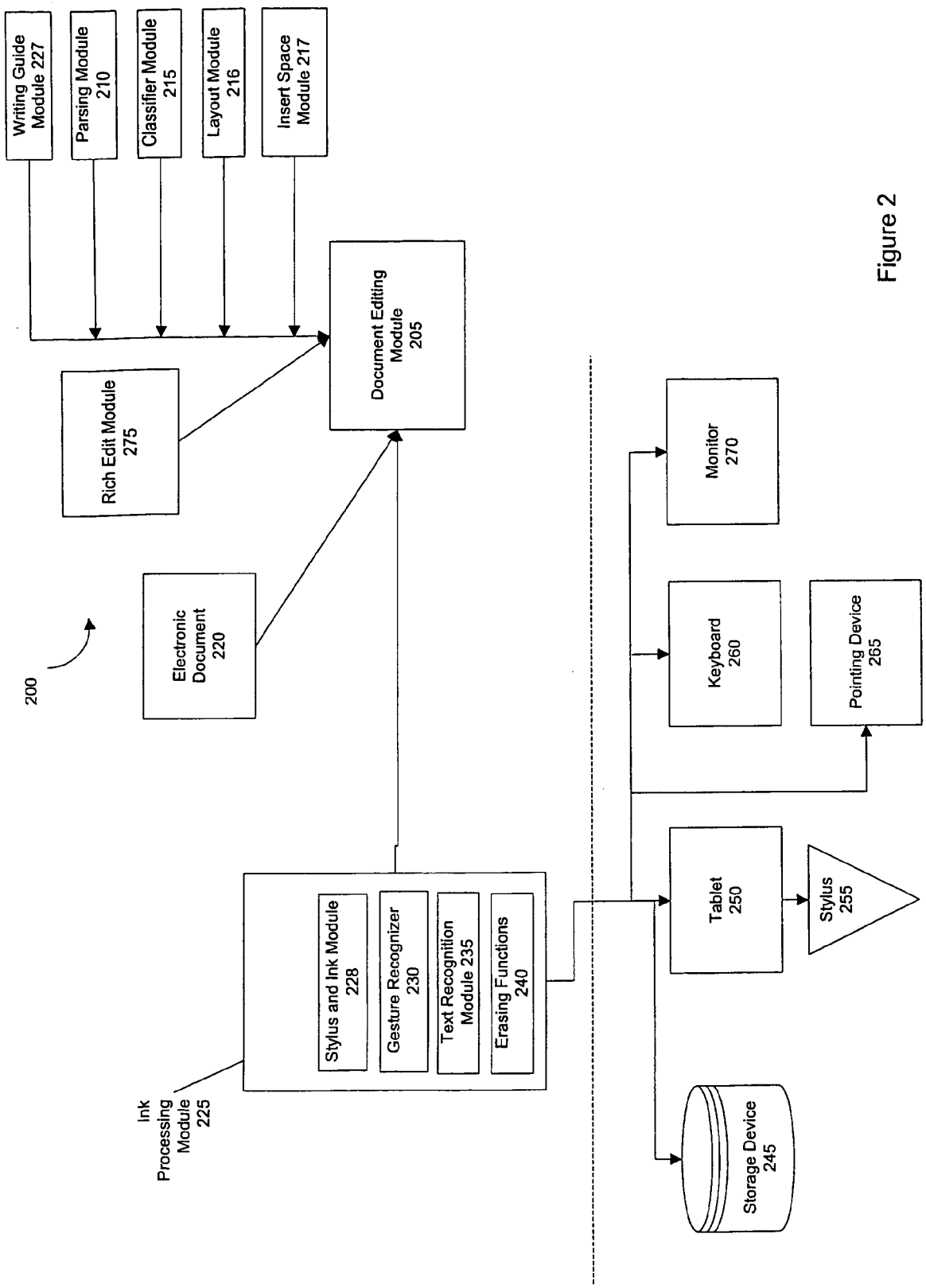
FIG. 2 is a block diagram depicting the primary functional components of an exemplary free-form document editor and related input devices.

FIG. 2 is a block diagram depicting the primary functional components of an exemplary free-form document editor and related input devices. Specifically, FIG. 2 depicts typical hardware and software components used in operating an exemplary embodiment of the invention in the context of a free-form document editor. Conventional input devices are represented by the keyboard 260 and the pointing device 265 (e.g., mouse, pen or stylus, and tablet). A user can enter commands and information into the computer 120 using the pointer device and/or another input device. Other input devices (not shown) may include a microphone, joystick, game pad, satellite dish, and scanner. A conventional output device, such as monitor 270, is used to display information from the computer 120. Other output devices (not shown) can include a printer or speaker.

Other hardware components shown in FIG. 2 include an electronic tablet 250 and an accompanying stylus 255. The tablet 250 and stylus 255 are used to input handwriting strokes which can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200, all of the hardware components are coupled to an ink processing software module 225. The ink processing module 225 is operable to receive data from the electronic tablet 250 and to render that data as electronic ink. In one embodiment of the present invention, the ink processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and a text recognition module 235 can be designed to identify certain handwriting strokes and assign them a particular significance. For example, certain gestures such as a cross-out may be recognized and associated with other editing processes. The ink processing module 225 also can include an erasing functions module 240 for removing electronic ink that has been previously rendered as text.

Although ink processing modules are known in the art and necessary for an electronic tablet to function, a novel document editing module has been developed by the Microsoft Corporation of Redmond, Wash. that capitalizes on the benefits of handwriting processing technology. The exemplary document editing module (i.e., document editor) is a freeform document editor that leverages the functionality of electronic handwriting technology to enable more effective and efficient note taking. Specifically, a document editing module 205 facilitates the manipulation of electronic ink so that a user can create and modify an electronic document 220 with greater ease and sophistication. In an exemplary embodiment, the document editing module 205 comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Software modules such as the layout module 216 and the insert space module 217 can be designed to control how electronic ink is rendered and moved. A writing guide module 227 can provide a writing guide according to an exemplary embodiment of the present invention on the tablet 250.

Exemplary embodiments of the present invention relate most directly to providing a writing guide on the tablet 250. The functionality of various embodiments may be performed by the writing guide module 227 or may be fully integrated into the operation of the document editing module 205. FIGS. 1 and 2 provide a general overview of the environments in which the inventors contemplate exemplary embodiments of the present invention will be used.

Exemplary Embodiments

Figure 3:
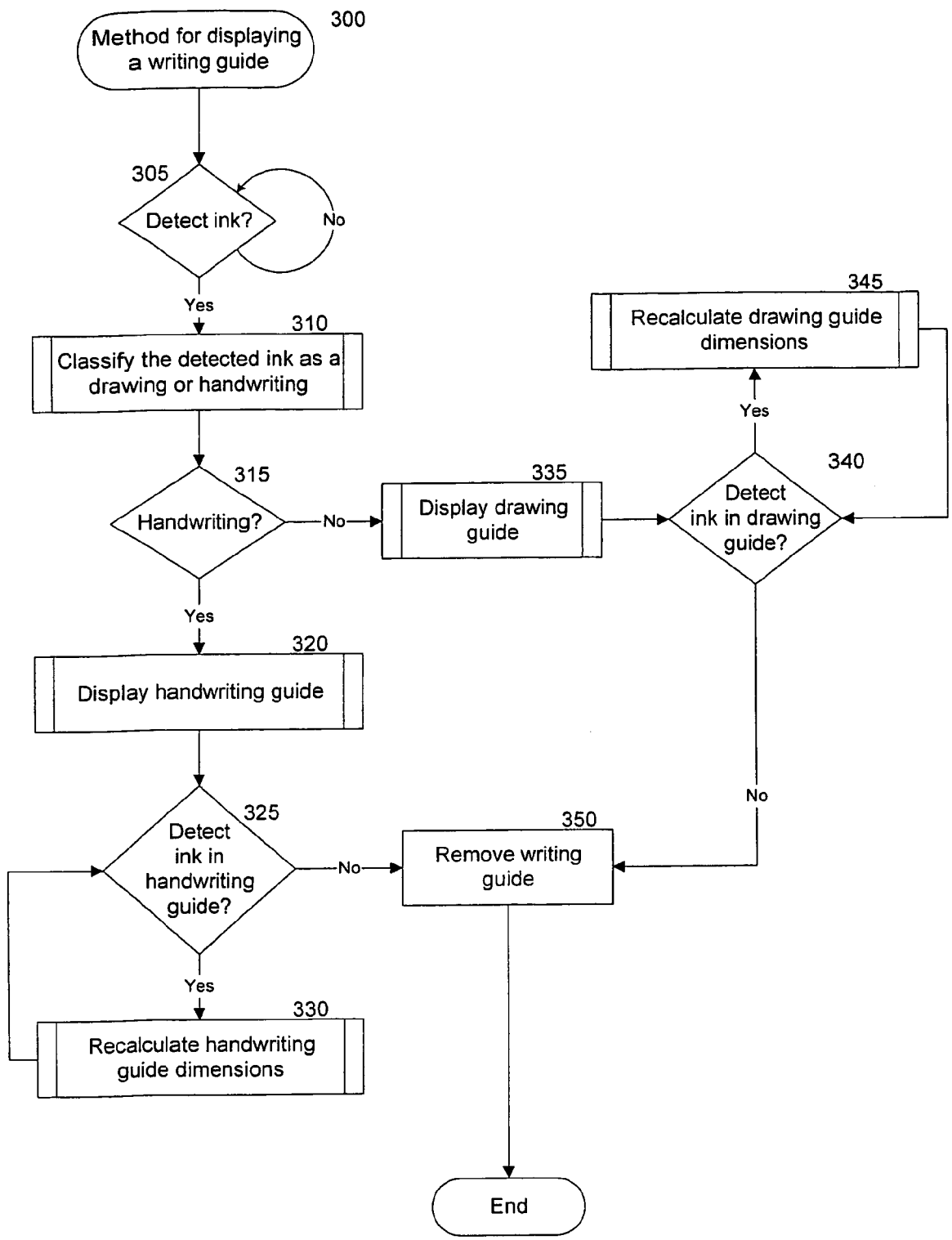
FIG. 3 is a flow chart depicting a method for displaying a writing guide according to an exemplary embodiment of the present invention.

FIG. 3 is a flow chart depicting a method 300 for displaying a writing guide according to an exemplary embodiment of the present invention. In step 305, the writing guide module 227 determines whether a user has provided electronic ink by creating writing strokes on the tablet 250. If not, then the writing guide module 227 repeats step 305 until it detects electronic ink. If the writing guide module 227 detects ink in step 305, then the method branches to step 310.

In step 310, the writing guide module 227 classifies the detected ink as either a drawing or handwriting. Based on that classification, the writing guide module 227 determines in step 315 whether the detected ink comprises handwriting. If yes, then the method branches to step 320. In step 320, the writing guide module 227 displays a handwriting writing guide (hereinafter "handwriting guide") on the tablet 250. In step 325, the writing guide module 227 continually detects additional ink provided in the handwriting guide. As additional ink is detected, the method proceeds to step 330, where the writing guide module 227 continually recalculates the handwriting guide's dimensions to adjust to the size of the detected ink. The method then returns to step 325 to continue detecting additional ink in the handwriting guide. When the writing guide module 227 does not detect any additional ink in the handwriting guide, then the method branches to step 350. In step 350, the writing guide module 227 deactivates the handwriting guide to remove it from the tablet 250. In alternative embodiments of the present invention, the user can deactivate a handwriting guide by any of the following exemplary methods: (1) activation of another writing guide of any type; (2) hovering off the drawing guide for longer than one second or other predetermined time; and (3) switching modes through the toolbar or other menu. Accordingly, any of those actions by the user can cause the writing guide module 227 to perform step 350 by deactivating the handwriting guide to remove it from the tablet 250.

Referring back to step 315, if the writing guide module 227 determines that the detected ink comprises a drawing, then the method branches to step 335. In step 335, the writing guide module 227 displays a drawing writing guide (hereinafter "drawing guide") on the tablet 250. In step 340, the writing guide module 227 monitors the drawing guide to continually detect ink input in the drawing guide. As the writing guide module 227 detects ink in the writing guide, the method continually recalculates the drawing guide's dimensions in step 345 to adjust to the size of the detected ink. The method then returns to step 340 to continue detecting ink in the drawing guide. When the writing guide module 227 does not detect additional ink in the drawing guide, the method branches to step 350. In step 350, the writing guide module 227 deactivates the drawing guide to remove it from the tablet 250. In alternative embodiments of the present invention, the user can deactivate a handwriting guide by any of the following exemplary methods: (1) activation of another writing guide of any type; (2) hovering off the drawing guide for longer than one second or other predetermined time; and (3) switching modes through the toolbar or other menu. Accordingly, any of those actions by the user can cause the writing guide module 227 to perform step 350 by deactivating the handwriting guide to remove it from the tablet 250.

In an exemplary embodiment, a writing guide can be presented automatically when the user begins to write on the tablet 250 with the stylus 255. In an alternative exemplary embodiment, a writing guide can be presented initially by selecting a writing guide option from a menu. That selection can be made with a mouse, keyboard, or stylus. In another exemplary embodiment, the writing guide module 227 can recognize a gesture tap on a blank part of the tablet 250 as a way to insert a new writing guide. For example, the user can tap the stylus 255 on a blank part of the tablet 255. Then, the writing guide module 227 can recognize the gesture tap and can insert a writing guide at that location.

Figure 4:
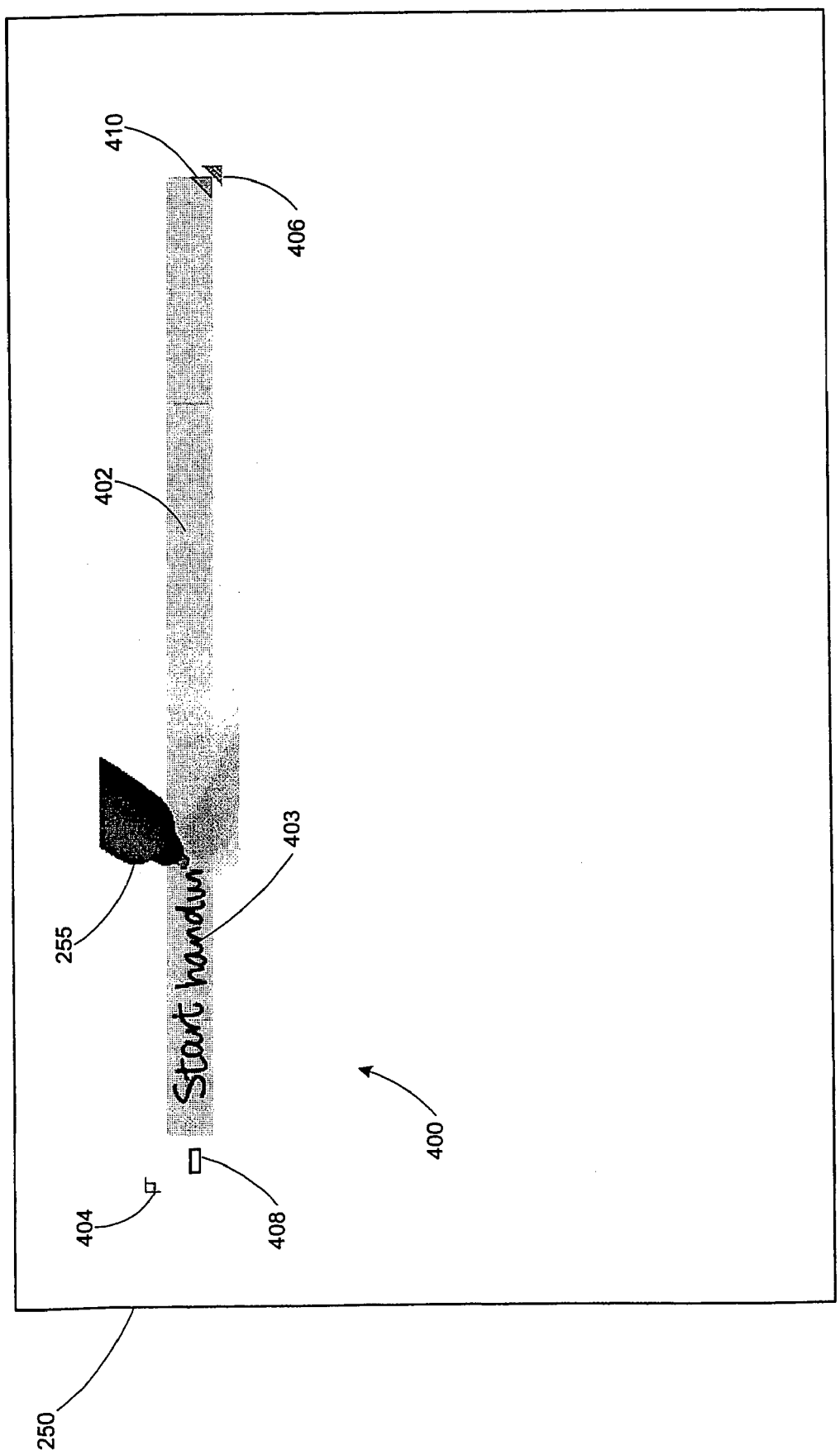
FIG. 4 illustrates a writing guide displayed on a tablet according to an exemplary embodiment of the present invention.

FIG. 4 illustrates a handwriting guide 400 displayed on a tablet 250 according to an exemplary embodiment of the present invention. The handwriting guide 400 comprises a writing area 402. As shown, a user can create handwriting 403 in the writing area 402 with the stylus 255. The handwriting guide 400 comprises other elements to enhance the available features. For example, the handwriting guide 400 comprises outline object handles 404, 406 to define the boundaries of an outline object. The handwriting guide 400 also comprises an element node handle 408 to identify individual object elements within the outline object. For example, the individual object elements can comprise individual paragraphs within the outline object. The element node handle 408 can allow moving or selecting individual object elements within the outline object. The handwriting guide 400 also comprises a merge handle 410 to allow merging of individual object elements. To merge individual object elements, a user can click down on the merge handle 410 with the stylus 255 or a mouse and then can drag the writing guide 400 over other object elements.

Figure 20:
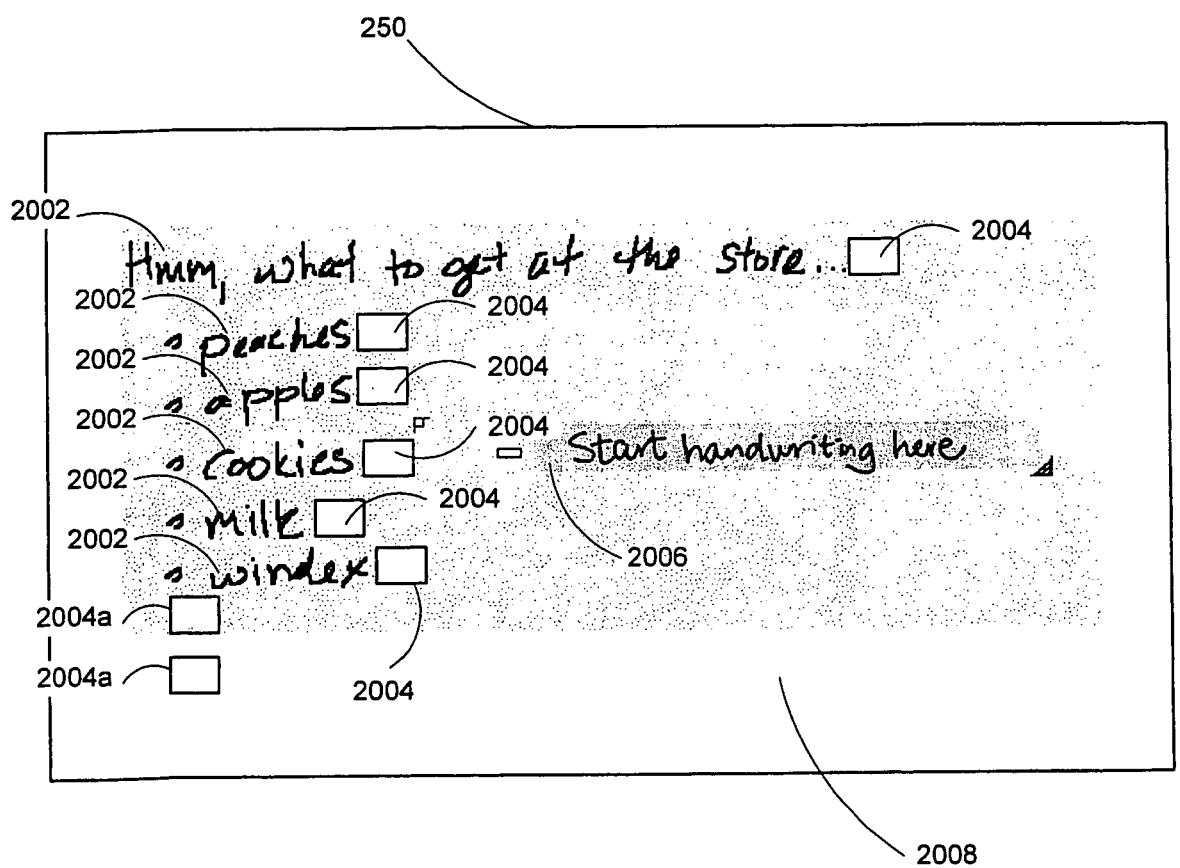
FIG. 20 illustrates active writing guide portions for adding handwriting to existing object elements according to an exemplary embodiment of the present invention.

Outline object handles 406 can operate according to the following exemplary embodiment. If a user has created an outline having three lines of handwriting/text, then the lower right outline object handle 406 is provided under the third line. Although the handle is under the third line, two more lines are available under that last line where the user can create new paragraphs. In an exemplary embodiment, the two additional, available lines are not real until the user writes into them. The two additional lines can be accessed through the exemplary writing guide portions 2004a (FIG. 20). If the user hovers the stylus 255 over either of the two new paragraph writing guide portions 2004a, the outline object handle 406 moves down underneath that line to show that writing on that writing guide portion will add the new paragraph to the already existing outline object. In an exemplary embodiment, the object handle 406 can remain in that extended location, even if the user moves the stylus 255 without inputting any handwriting into that line.

The writing guide module 227 can default to single line paragraphs in the outline object. Accordingly, each new line of handwriting can be formatted as a separate paragraph. For long sentences that span more than one line, the writing guide 400 can automatically extend to accommodate the additional space required. For example, as the user writes handwriting near the right end of the writing area 406, the writing area 406 can expand to extend over the next line. Anything written into the next line then becomes part of the same paragraph as the previous line. In an exemplary embodiment, a boundary can be established near the right end of the writing area 406. Writing handwriting into the boundary area can extend the writing area over the next line. For example, the boundary area can equal three writing guides heights.

In an alternative embodiment, the right boundary of the writing guide can be extended if the user continues and writes past the edge of the right boundary. In that case, the writing guide gets wider. An extended writing area on the next line can also be provided. Additionally, the extended writing area on the next line can remain the original length or can be extended similarly to the line extended by the user.

Additionally, multiple paragraphs can be merged manually into a single paragraph. For example, if the user begins the next line without writing handwriting into the boundary area, then the next line comprises a separate paragraph. The separate paragraph exists even if the user intended the lines as part of the same paragraph. In that exemplary embodiment, the user can merge the two separate paragraphs into one paragraph. Each line (each object element) can have a merge handle 410 to indicate the separate object elements. Accordingly, the user can merge paragraphs or lines by dragging one merge handle 410 over the other paragraph.

A user also can merge paragraphs by selecting adjacent paragraphs and selecting a merge paragraphs option from a drop down menu. The user can make those selections using a mouse, keyboard, or stylus. In an alternative embodiment, the writing guide module 227 can present a clickable user interface icon that hovers to the left of the handwriting guide. The user can click on the icon to merge two lines into one paragraph, or to split a paragraph into multiple paragraphs.

In an exemplary embodiment, if the user starts a new outline object close enough to the left boundary of the page such that the outline handle 404, node handle 408, or other various writing guides discussed below cannot be displayed on the viewing screen, then the outline object can extend to the left off of the viewing screen. A horizontal page scroll bar can indicate the off-screen areas.

Figure 5:
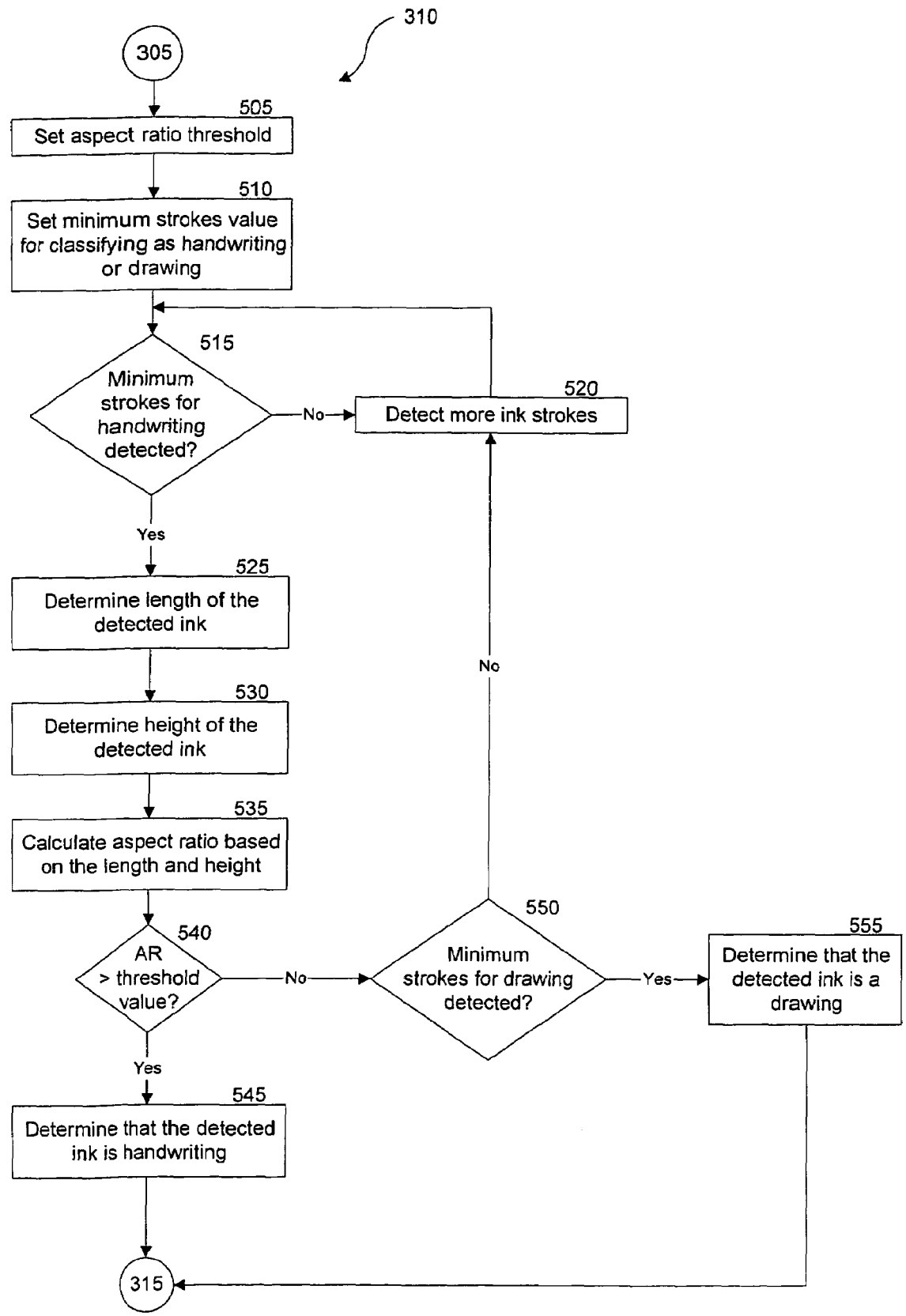
FIG. 5 is a flow chart depicting a method for classifying detected ink as a drawing or handwriting according to an exemplary embodiment of the present invention.

FIG. 5 is a flow chart depicting a method for classifying detected ink as a drawing or handwriting according to an exemplary embodiment of the present invention, as referred to in step 310 of FIG. 3. In step 505, an aspect ratio threshold can be established. In an exemplary embodiment, a user sets the aspect ratio threshold. Alternatively, a default aspect ratio setting can be used. The aspect ratio measures the length to height of all detected ink and can provide an indication as to whether the detected ink comprises a drawing or handwriting. For example, handwriting typically comprises ink having a high aspect ratio as a user writes along a line. A high aspect ratio corresponds to a large length when compared to the height. On the other hand, a drawing typically has a low aspect ratio due to the more uniform distribution of the ink. Such a uniform distribution typically provides a length and height that are relatively close in size.

In step 510, a number of minimum strokes can be established for classifying the detected ink as a handwriting or drawing. Setting a minimum number of strokes can ensure detection of enough ink to provide an accurate classification. In an exemplary embodiment, the minimum number of strokes for handwriting can be three and for a drawing can be five. Other minimum numbers of strokes are within the scope of the present invention. In an alternative exemplary embodiment, a minimum amount of ink can be established for classifying the detected ink as a handwriting or drawing.

In step 515, the writing guide module 227 can determine whether a user has input the minimum number of strokes for classifying the ink as handwriting. If not, then the method branches to step 520 to detect more ink strokes. If the user has input the minimum number of strokes for handwriting, then the method branches to steps 525 and 530. In steps 525 and 530, the writing guide module 227 determines the length and height, respectively, of the detected ink. In an alternative embodiment, step 515 can determine whether a user has input the minimum amount of ink for classifying the ink as handwriting.

In step 535, the writing guide module 227 calculates the aspect ratio for the detected ink, based on the length and height determined in steps 525 and 530, respectively. In step 540, the writing guide module 227 determines whether the calculated aspect ratio is greater than the aspect ratio threshold set in step 505. If yes, then the writing guide module 227 determines in step 545 that the detected ink is handwriting. The method then proceeds to step 315 (FIG. 3).

Referring back to step 540, if the writing guide module 227 determines that the calculated aspect ratio is less than the threshold value, then the method branches to step 550. In an alternative embodiment, step 540 can determine if the writing guide has grown larger than twice the height of a default line height. If so, then the method can branch to step 550 for classifying the ink as a drawing.

In step 550, the writing guide module 227 determines whether the user has input the minimum number of strokes to classify the ink as a drawing. If not, then the method branches back to step 520 to detect more ink strokes and to recalculate the aspect ratio of the detected ink. If the user has input the minimum number of strokes, then the method branches to step 555 in which the writing guide module 227 determines that the detected ink is a drawing. The method then proceeds to step 315 (FIG. 3).

Figure 6:
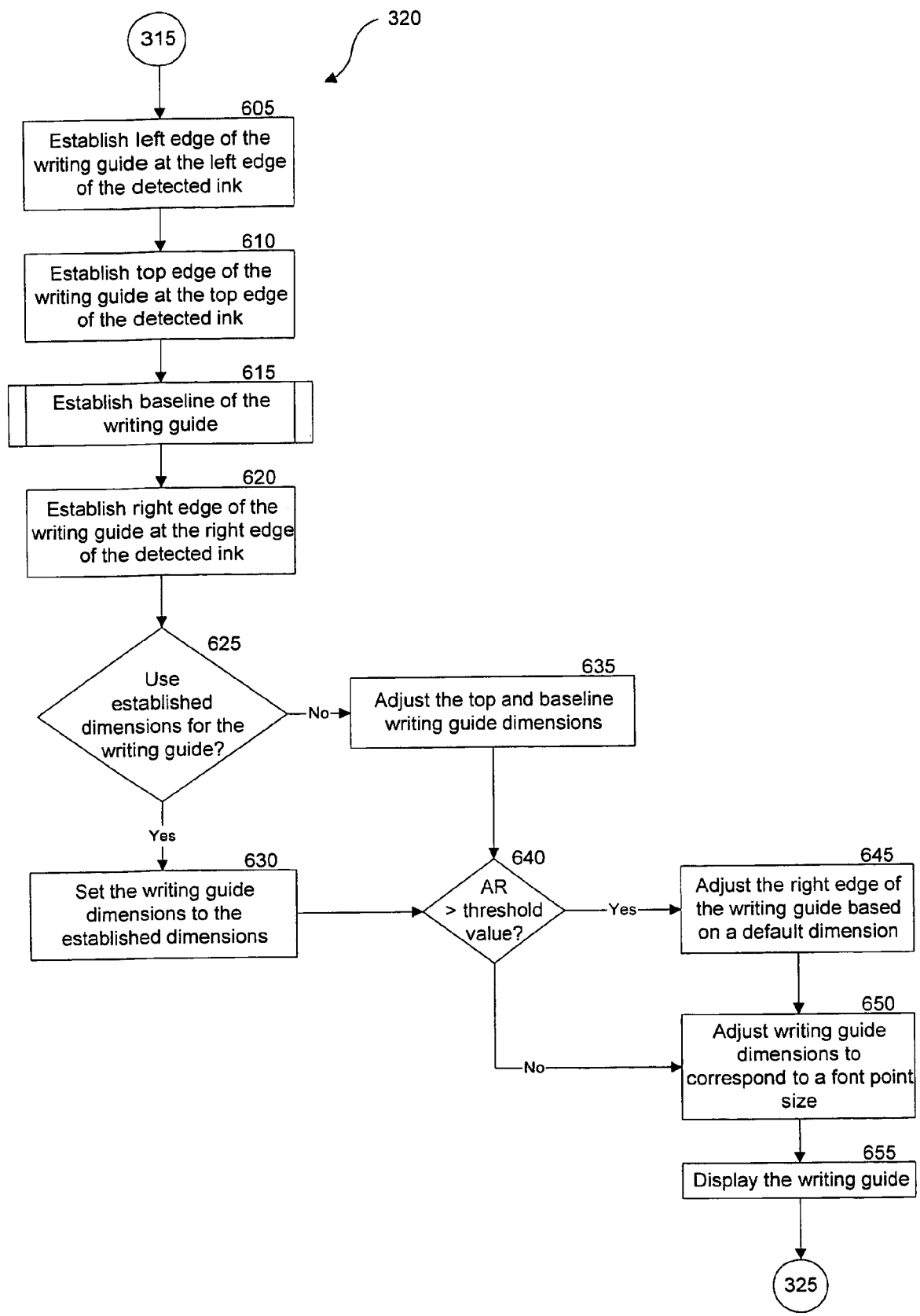
FIG. 6 is a flow chart depicting a method for displaying a handwriting guide according to an exemplary embodiment of the present invention.
Figure 7A:
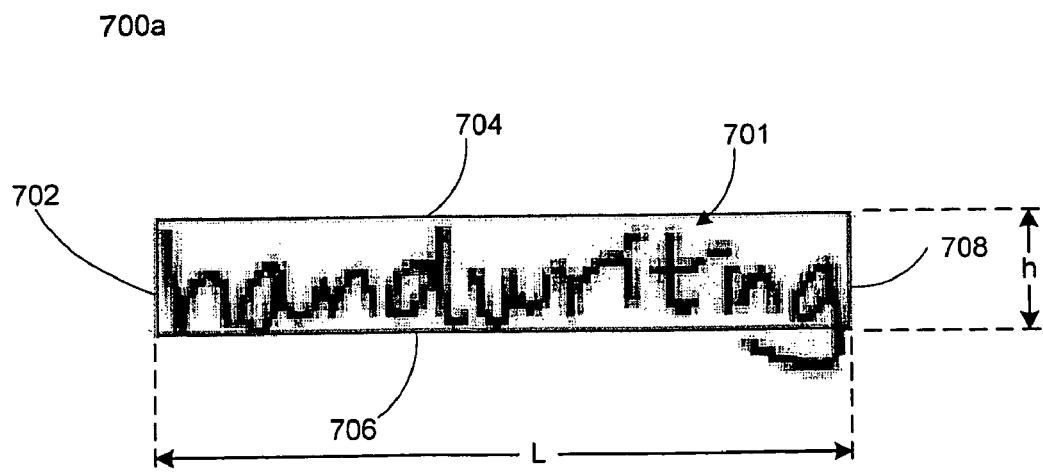
FIG. 7A illustrates dimensions of a handwriting guide according to an exemplary embodiment of the present invention.
Figure 7B:
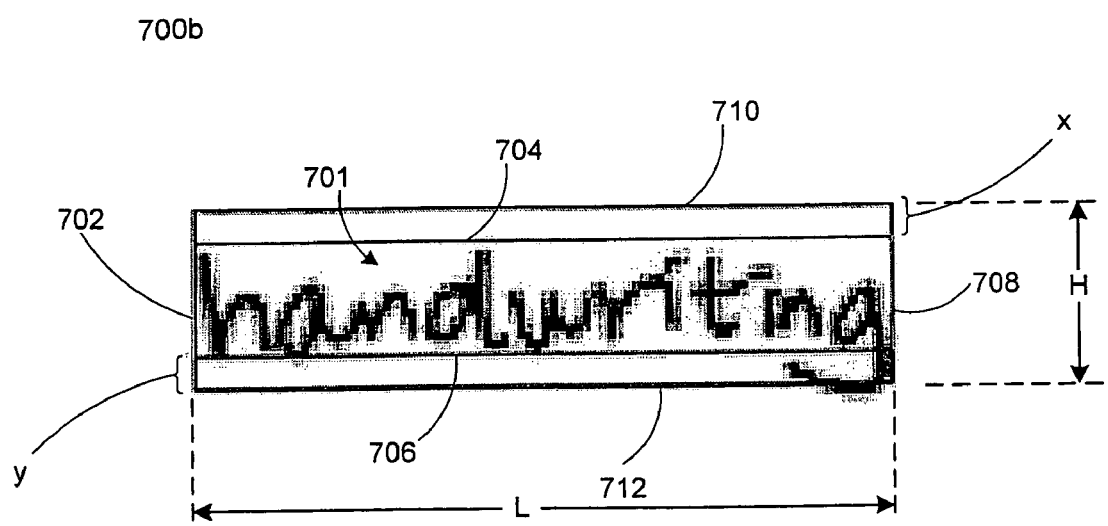
FIG. 7B illustrates dimensions of a handwriting guide according to another exemplary embodiment of the present invention.

FIG. 6 is a flow chart depicting a method for displaying a handwriting guide according to an exemplary embodiment of the present invention, as referred to in step 320 of FIG. 3. The method of FIG. 6 will be described with reference to FIGS. 7A and 7B, which illustrate various dimensions of exemplary handwriting guides. FIG. 7A illustrates dimensions of a handwriting guide 700a according to an exemplary embodiment of the present invention. FIG. 7B illustrates dimensions of a handwriting guide 700b according to another exemplary embodiment of the present invention. In the exemplary embodiments, dimensions of the handwriting guide are based on a bounding rectangle defining the boundaries of the detected ink.

In step 605 of FIG. 6, the writing guide module 227 establishes a left edge 702 of the writing guide 700a, 700b. The left edge 702 corresponds to the left edge of detected ink 701. In step 610, the writing guide module 227 establishes a top edge 704 of the writing guide 700a, 700b. The top edge 704 corresponds to the top edge of the detected ink 701. In step 615, the writing guide module 227 establishes a baseline 706 of the writing guide 700a, 700b. Exemplary embodiments for establishing the baseline 706 are discussed below with reference to FIGS. 8-11. In step 620, the writing guide module 227 establishes a right edge 708 of the writing guide 700a, 700b. The right edge 708 corresponds to the right edge of the detected ink 701. In an alternative embodiment, the right edge 708 can be established based on a default outline width which the user can modify. The right edge 708 can be adjusted to prevent it from extending past the viewing screen of the tablet 250 or overlapping another object on the page.

Several alternatives exist for the final dimensions of the writing guide 700a, 700b. For example, the dimensions 702-708 established in steps 605-620 and illustrated in FIG. 7A can be used for the writing guide 700a. Alternatively, those dimensions can be adjusted as shown in FIG. 7B to provide a larger writing area for the writing guide 700b. Accordingly, in step 625, the writing guide module 227 determines whether to use the dimensions established in steps 605-620 for the writing guide. If yes, then the method branches to step 630. In step 630, the writing guide module 227 sets the dimensions of the writing guide 700a to the established dimensions. The method then proceeds to step 640.

Referring back to step 625, if adjusted dimensions will be used for the handwriting guide, then the method branches to step 635. In step 635, the writing guide module 227 adjusts the dimensions of the writing guide. For example, as shown in FIG. 7B, the writing guide module 227 can adjust the top edge 704 by a predetermined spacing x to result in a new top edge 710. Additionally, the writing guide module 227 can adjust the baseline 706 by a predetermined spacing y to result in a new baseline 712.

The predetermined spacings x and y can be chosen to provide an enlarged writing area for the writing guide 700b. Accordingly, the predetermined spacings x and y can allow for diacritics and comfort while writing. The amount of predetermined spacing x and y can be a function of a mathematical algorithm involving the dimensions of the bounding rectangle. However, other spacings are not beyond the scope of the present invention. For example, the spacings can be arbitrarily chosen instead of being the product of a calculation. In an exemplary embodiment, the predetermined spacing x can be x=ten percent of the bounding rectangle height h (FIG. 7A), and the predetermined spacing y can be y=twenty percent of the bounding rectangle height h.

The method then proceeds to step 640. In step 640, the writing guide module 227 determines whether the aspect ratio of the detected ink is greater than a predetermined threshold value. The aspect ratio provides a ratio of the length L to the height h (FIG. 7A) or the height H (FIG. 7B) of the detected ink 701. If not, then the method branches to step 650. If the aspect ratio is greater than the predetermined threshold value, then the method branches to step 645. In an exemplary embodiment, the predetermined aspect ratio threshold can be 3:1. Other aspect ratio thresholds are within the scope of the present invention.

In step 645, the writing guide module 227 adjusts the right edge 708 of the writing guide based on a default dimension. For example, the default dimension can comprise a right page margin or a right edge of the tablet's 250 viewing area. Accordingly, once the user has input a sufficient amount of ink to provide accurate dimensions for the writing guide, the writing guide can be extended across the viewing area. The method then proceeds to step 650.

In an exemplary embodiment, the right edge 708 of the writing guide can extend to the right without overlapping an object or going off the viewing screen of the tablet 250. If the page width is wider than the viewing screen, then the writing guide can extend to the edge of the viewing screen.

In step 650, the writing guide module 227 adjusts the dimensions of the writing guide to correspond to a font point size. For example, the dimensions of the writing guide can be adjusted to the nearest one-half point size. Accordingly, the dimension h (FIG. 7A), or the dimension H (FIG. 7B), can be adjusted to correspond to the nearest point size of the font. In that regard, the dimensions can be adjusted either up or down to correspond to the nearest point size. The method then proceeds to step 655 in which the writing guide module 227 displays the writing guide. The method then proceeds to step 325 (FIG. 3).

In an alternative exemplary embodiment, the writing guide dimensions can correspond to rule lines on the tablet 250. For example, if the bottom edge of the calculated writing guide is within a specified tolerance of the closest rule line, then the writing guide can be sized such that it's entire boundary is enclosed within the rule lines. In an exemplary embodiment, the specified tolerance can be thirty percent.

Figure 8:
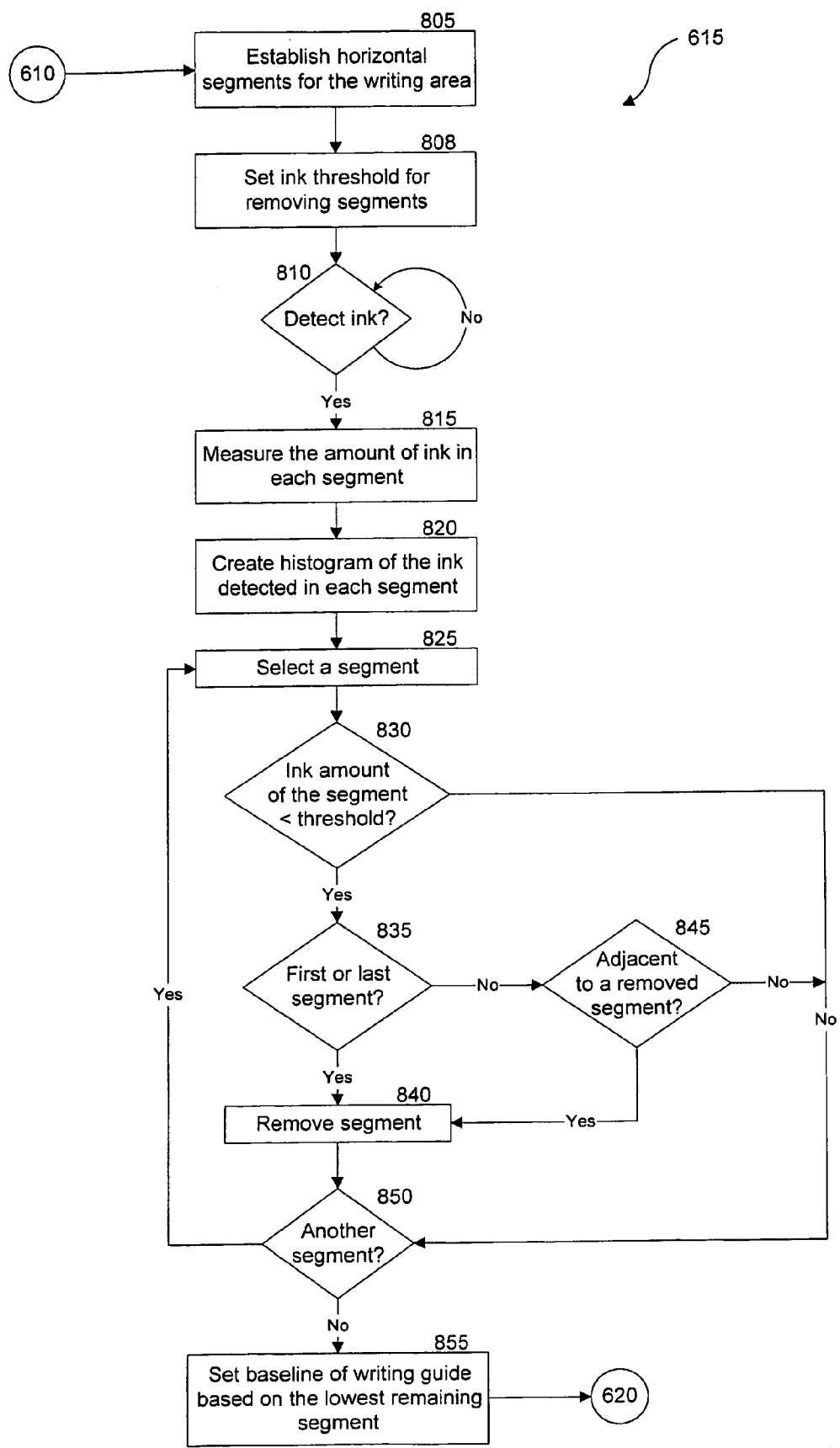
FIG. 8 is a flow chart depicting a method for establishing a baseline of a writing guide according to an exemplary embodiment of the present invention.
Figure 9:
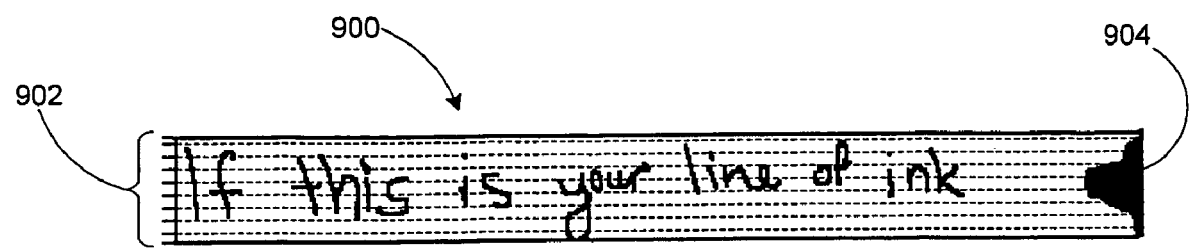
FIG. 9 illustrates a representative ink histogram showing the amount of ink in respective segments of a line of ink.

A method for establishing the baseline of a writing guide according to an exemplary embodiment of the present invention will now be described with reference to FIGS. 8 and 9. FIG. 8 is a flow chart depicting a method for establishing a baseline of a writing guide according to an exemplary embodiment of the present invention, as referred to in step 615 of FIG. 6. FIG. 9 illustrates a representative ink histogram 904 showing the amount of ink in respective segments 902 of a line of ink 900.

In step 805 of FIG. 8, the writing guide module 227 establishes horizontal segments 902 for the line of ink 900. Any number of horizontal segments can be used for the line of ink 900. In an exemplary embodiment of the present invention, the writing guide module 227 establishes thirty-two horizontal segments 902 for the line of ink 900. Other amounts of horizontal segments 902 are within the scope of the present invention.

In step 808, an ink threshold for removing a horizontal segment 902 from the writing area can be established. The segment removal threshold represents an amount of ink below which a segment 902 will be removed from the writing area. For example, bottom segments 902 of the line of ink 900 typically will contain less ink. Accordingly, those segments can be removed from the writing area to determine the baseline of the writing guide.

In an exemplary embodiment, the threshold for removing segments can be set at three percent. Accordingly, if a segment contains less than three percent of the line's ink, then that segment is removed from the writing guide dimensions. Other values for the threshold are within the scope of the present invention.

In step 810, the writing guide module 227 determines whether it has detected ink in the line of ink 900. If not, then the method repeats step 810 until ink is detected. When the writing guide module 227 detects ink in the line of ink 900, then the method branches to step 815. In step 815, the writing guide module 227 measures the amount of ink in each horizontal segment 902. In step 820, the writing guide module 227 creates a histogram 904 of the ink detected in each segment 902.

In step 825 the writing guide module 227 selects a segment 902 from the line of ink 900. In step 830, the writing guide module 227 determines whether the amount of ink in the selected segment is less than the predetermined segment removal threshold. If not, then the method branches to step 850 to select another segment. If the ink amount of the selected segment is less than the predetermined threshold, then the method branches to step 835.

In step 835, the writing guide module 227 determines whether the selected segment is the first or the last segment of the line of ink 900. The first and last segments of the line of ink 900 correspond to the top and bottom segments, respectively, of the line of ink 900. If yes, then the method branches to step 840, where the writing guide module 227 removes the selected segment from the line of ink 900. The method then proceeds to step 850 to select another segment.

Referring back to step 835, if the selected segment is not the first or last segment, then the method branches to step 845. In step 845, the writing guide module 227 determines whether the selected segment is adjacent to a segment previously removed from the line of ink 900. If not, then the method branches to step 850 to select another segment. If yes, then the method branches to step 840. In step 840, the writing guide module 227 removes the selected segment from the line of ink 900. The method then proceeds to step 850 to select another segment. Accordingly, only segments at the top or bottom of the line of ink 900 are removed. Segments having little ink and near the middle of the line of ink 900 are not removed.

In step 850, the writing guide module 227 determines whether to analyze another segment 902 of the line of ink 900. If yes, then the method branches back to step 825 to select another segment 902. If not, then the method branches to step 855. In step 855 the writing guide module 227 sets the baseline 706 (FIGS. 7A and 7B) of the writing guide based on the lowest remaining segment 902 in the line of ink 900. The method then proceeds to step 620 (FIG. 6).

Additionally, the exemplary method of FIG. 6 can be used to set the top edge 704 of the writing guide. In that exemplary embodiment, the writing guide module 227 sets the top edge 704 of the writing guide based on the highest remaining segment 902 in the line of ink 900.

In an exemplary embodiment, an initial completion of step 825 comprises the writing guide module 227 selecting the lowest segment 902 in the line of ink 900. Each repeat completion of step 825 comprises selecting the next highest segment 902 in the line of ink 900 until reaching a segment having an ink amount above the segment removal threshold. That segment then establishes the baseline 706 (FIGS. 7A and 7B) of the writing guide. The method then concludes without examining extraneous segments.

Figure 10:
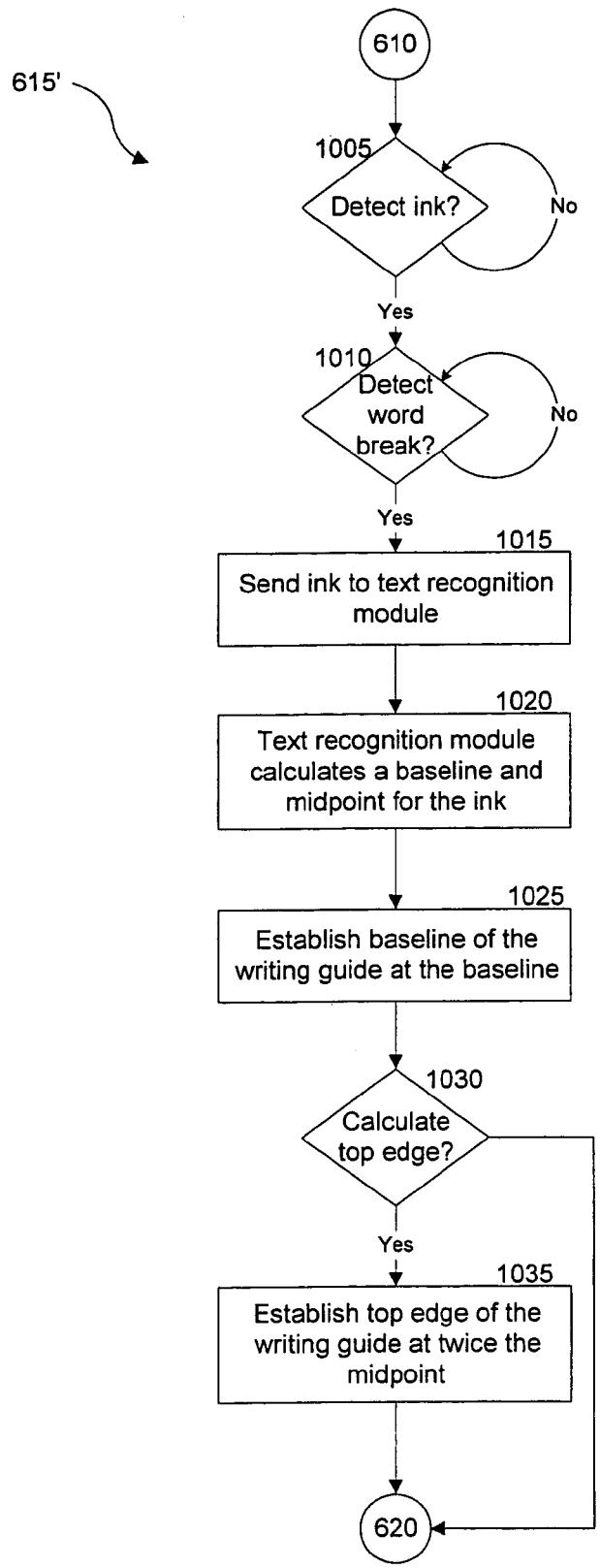
FIG. 10 is a flowchart depicting a method for establishing the baseline of a writing guide according to an alternative exemplary embodiment of the present invention.
Figure 11:
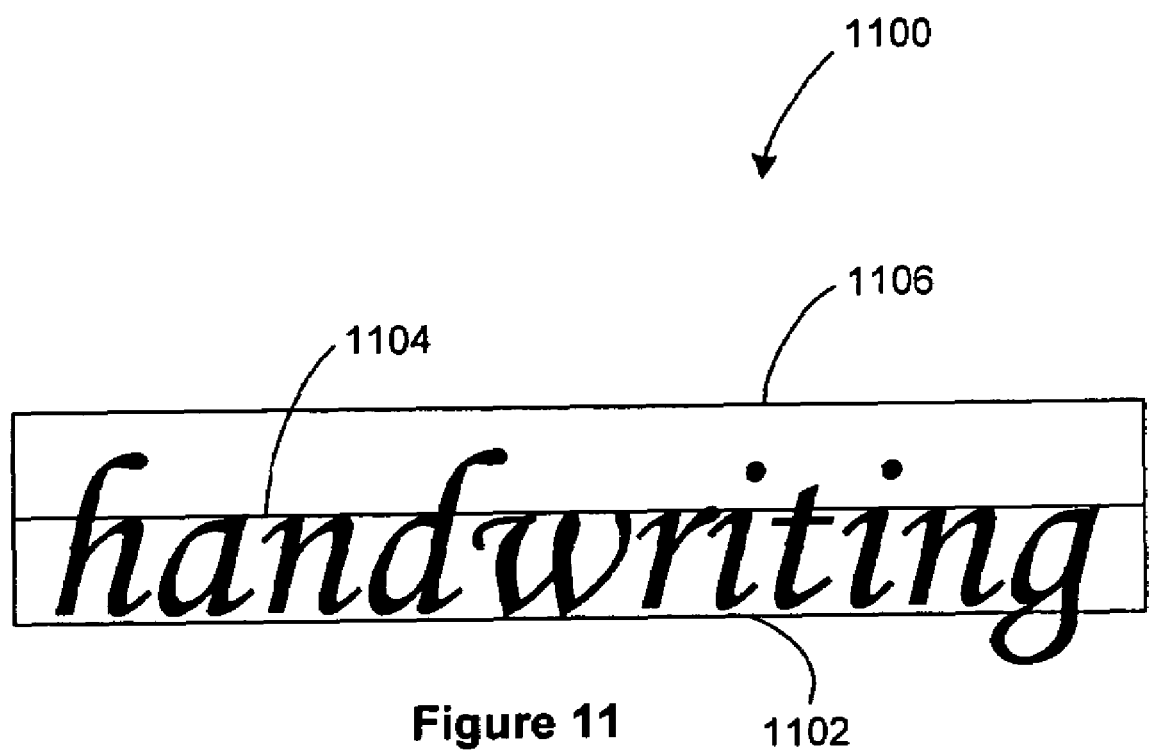
FIG. 11 illustrates dimensions of a writing guide established by the method of FIG. 10 according to an alternative exemplary embodiment of the present invention.

Another method for establishing the baseline of a writing guide according to an alternative exemplary embodiment of the present invention will now be described with reference to FIGS. 10 and 11. FIG. 10 is a flowchart depicting a method for establishing the baseline of a writing guide according to an alternative exemplary embodiment of the present invention, as referred to in step 615 of FIG. 6. To distinguish the alternative embodiments of step 615 described in FIGS. 8 and 10, the embodiment of FIG. 10 will be described as step 615'. FIG. 11 illustrates dimensions of a writing guide 1100 established by the method of FIG. 10 according to an alternative exemplary embodiment of the present invention.

In step 1005 of FIG. 10, the writing guide module 227 determines whether ink strokes have been provided on the tablet 250. If not, then the method repeats step 1005 until ink is detected. If yes, then the method branches to step 1010. In step 1010, the writing guide module 227 attempts to detect a word break between words written on the tablet 250. If the writing guide module 227 cannot detect a word break in step 1010, then step 1010 is repeated. If the writing guide module 227 detects a word break, then the method branches to step 1015.

In step 1015, ink detected prior to the word break is sent to the text recognition module 235. In step 1020, the text recognition module calculates a base line 1102 and a midpoint 1104 for the ink. Then, in step 1025, the writing guide module 227 establishes the baseline 706 (FIGS. 7A and 7B) of the writing guide at the calculated baseline 1102.

In step 1030, the writing guide module 227 determines whether to calculate the top edge 704 (FIGS. 7A and 7B) of the writing guide. If yes, then the method branches to step 1035 in which the writing guide module 227 calculates the top edge 1106 as twice the midpoint 1104. Accordingly, the writing guide module 227 establishes the top edge 704 of the writing guide at the calculated top edge 1106. The method then branches to step 620 (FIG. 6).

Referring back to step 1030, if the writing guide module 227 will not calculate the top edge 704, then the method branches directly to step 620 (FIG. 6).

Figure 12:
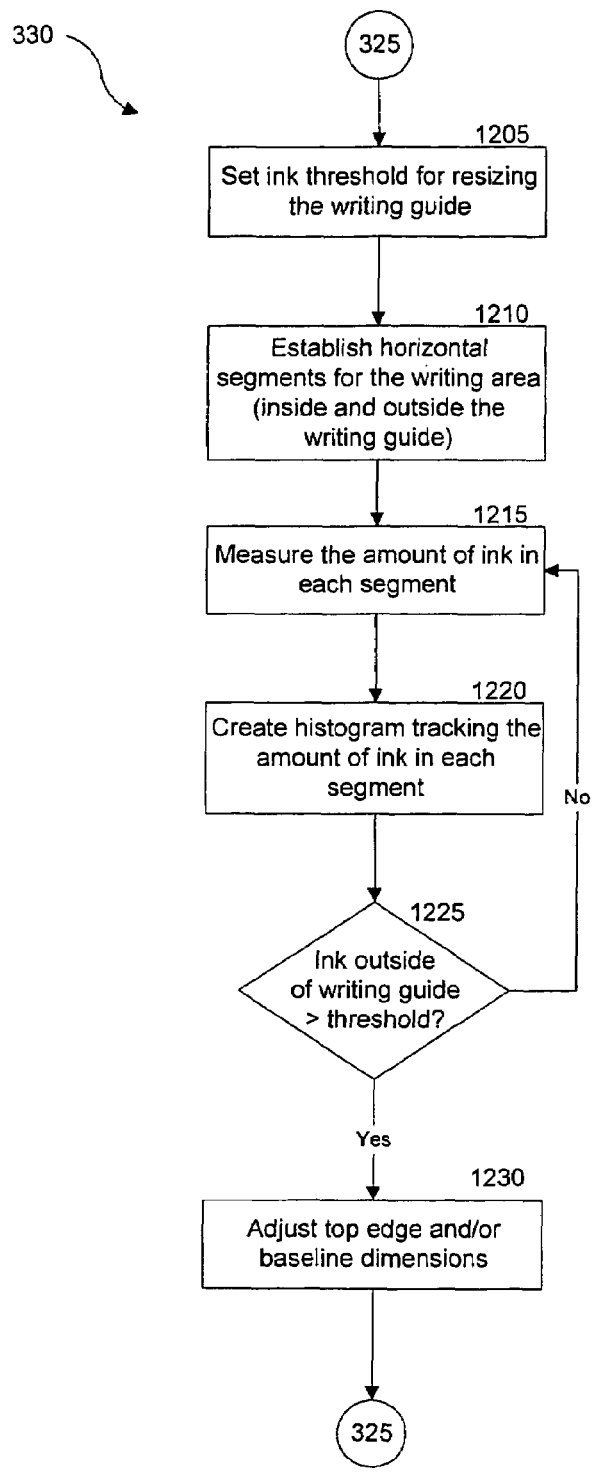
FIG. 12 is a flowchart depicting a method for recalculating handwriting guide dimensions according to an exemplary embodiment of the present invention.

FIG. 12 is a flowchart depicting a method for recalculating handwriting guide dimensions according to an exemplary embodiment of the present invention, as referred to in step 330 of FIG. 3. In step 1205, a resizing ink threshold can be established for resizing the writing guide. In an exemplary embodiment, a user can establish the threshold for resizing the writing guide. Alternatively, a default threshold can be established for resizing the writing guide. The resizing ink threshold can establish an ink amount outside of the writing guide beyond which the writing guide expands to include the outside ink. In one exemplary embodiment, the resizing ink threshold can be twenty percent. Accordingly, if twenty percent or more of the line's ink is outside of the current writing guide, then the writing guide extends up or down, or both, until the outside ink is reduced below the threshold. Other resizing ink thresholds are within the scope of the present invention.

In step 1210, the writing guide module 227 establishes horizontal segments on a writing area of the tablet 250. The writing area encompasses an area inside and outside of the writing guide 400 (FIG. 4). The horizontal segments can be established similarly to the horizontal segments 902 illustrated in FIG. 9. In an exemplary embodiment, thirty-two segments can be established for the writing area. Other amounts of segments are within the scope of the present invention.

In step 1215, the writing guide module 227 continually measures the amount of ink in each segment as ink strokes are provided on the tablet 250. In step 1220, the writing guide module 227 creates an ink histogram, tracking the amount of ink in each segment. The histogram can be similar to the histogram 904 illustrated in FIG. 9. In step 1225, the writing guide module 227 determines whether the amount of ink in all segments outside of the writing guide is greater than the resizing ink threshold. If not, then the method branches back to step 1215 to continue measuring the amount of ink in each segment as more ink strokes are provided on the tablet 250.

If the writing guide module 227 determines in step 1225 that the amount of ink in all segments outside the writing guide is greater than the resizing ink threshold, then the method branches to step 1230. In step 1230, the writing guide module 227 adjusts the top edge 704 (FIGS. 7A and 7B) and/or the baseline 706 (FIGS. 7A and 7B) until the amount of ink in all segments outside the writing guide is below the resizing threshold. In that regard, the top edge 704 can be reestablished at the top edge of all detected ink. Additionally, the baseline 706 can be reestablished as discussed above for step 615 of FIG. 6. The method then proceeds to step 325 (FIG. 3).

An exemplary embodiment, the writing guide can accommodate typical writing errors from the user. For example, the writing errors can include (1) lazy writing where some words stray either partially or entirely into a line above or below the current line; (2) inflated writing where the user intentionally writes significantly larger so that a portion of the ink is on the writing guide, but a large portion is not; and (3) rebellious writing where the user continues to write past a fixed border of the outline object.

For lazy writing and inflated writing, the writing guide size can expand to encompass the ink outside of the initial writing guide dimensions. The expansion can be performed as described above with reference to FIG. 12. For rebellious writing, the right edge of the writing guide can be extended to allow the user to input additional handwriting at the end of a line. The writing guide can be extended to the end of the viewing area on the tablet 250. Additionally, writing near the end of the writing guide can trigger the extend paragraph writing guide onto the next available line (discussed above).

Figure 13:
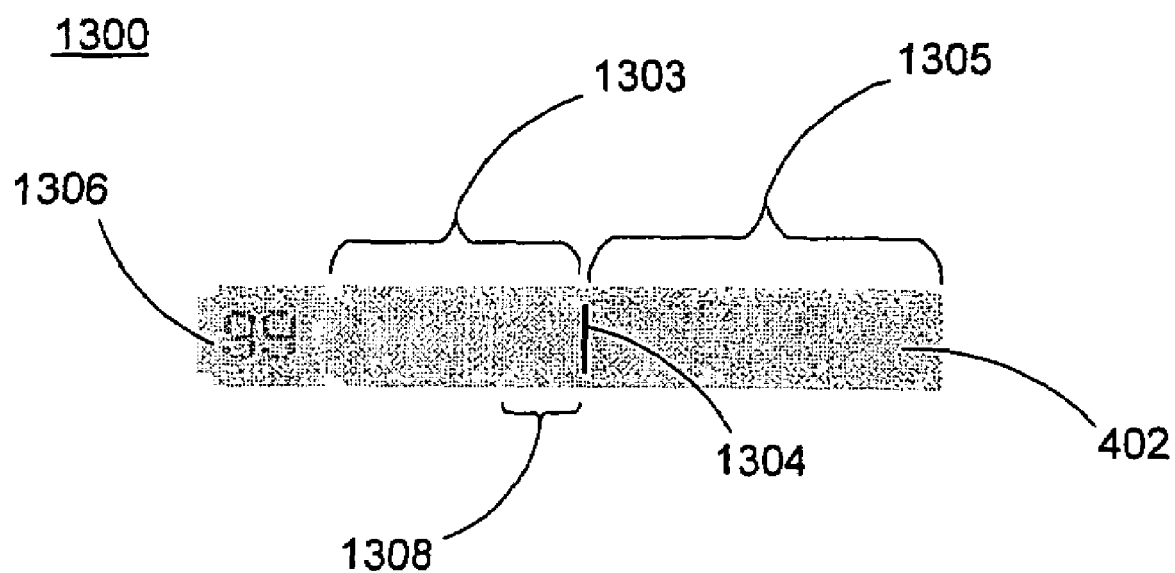
FIG. 13 illustrates a structured outline handwriting guide for an indented outline structure according to an exemplary embodiment of the present invention.

FIG. 13 illustrates a structured outline handwriting guide 1300 for an indented outline structure according to an exemplary embodiment of the present invention. A writing guide 1300 can reveal indented outline structure to the user and can provide a user interface on which to build the desired structure.

As shown, the writing guide 1300 comprises the writing area 402. Within the writing area 402, the writing guide 1300 comprises a next indent level indicator 1304, dividing a first level region 1303 from a second level region 1305. The indicator 1304 illustrates the next indent level in an outline structure. If a user writes in the writing area 402 to the left of the indicator 1304, in the first level region 1303, then the handwriting corresponds to handwriting on a first level of the outline structure. If a user writes in the writing area 402 to the right of the indicator 1304, in the second level region 1305, then the handwriting corresponds to handwriting on a second level of the outline structure. In an exemplary embodiment, the indent indicator 1304 can disappear when ink enters the first level region 1303.

The writing guide 1300 also comprises a bullet region 1306. Before a user activates the bullet region 1306, the bullet region 1306 can present a lightly shaded bullet or number. The lightly shaded bullet or number can indicate a bullet outline structure available to the user. If the user activates the bullet region 1306 with the stylus 255 or the pointing device 265, the lightly shaded bullet or number can be replaced by the real character. The user can activate the bullet region 1306 by tapping the stylus 255 on the bullet region 1306. Additionally, after activation, the user can select the bullet region 1306 to edit the displayed number or to select another bullet type.

In an exemplary embodiment, the bullet region 1306 can have an initial default size to accommodate one or more numbers. The bullet region can grow to accommodate larger font size, writing guide height, or more numbers. For example, if the next number in the bullet series comprises three digits instead of two, then the bullet region widens to accommodate.

Alternatively, a user can write ink into the bullet region 1306 to create a custom bullet. Any ink object input into the bullet region can create a custom bullet. A bullet region at the same level as a previous bullet region has the same ink symbol set as the custom bullet. Accordingly, selecting the bullet region inserts the custom ink bullet. The bullet then can be repeated on subsequent lines.

The writing guide 1300 also comprises a second level bullet region 1308. Hovering the stylus 255 over the bullet region 1308 can produce a lightly shaded bullet or number in the bullet region 1308. Selecting the second level bullet region 1308 can activate the bullet as described above for the bullet region 1306.

In an exemplary embodiment, the writing guide 1300 can comprise multiple indent levels. Accordingly, the writing guide 1300 can comprise multiple indent level indicators to separate the multiple indent levels. Additionally, each indent level can have a corresponding bullet region to provide bullets for a respective indent level.

In another exemplary embodiment, the writing guide 1300 can comprise features discussed above for the writing guide 400 of FIG. 4. For example, the features can comprise a node handle, an outline object handle, and an object element handle.

Figure 14A:
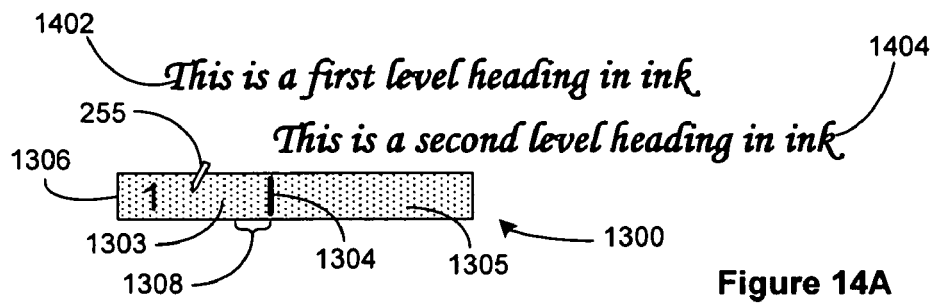
FIGS. 14A, 14B, 14C, 14D, and 14E illustrate an operation of a structured outline handwriting guide according to an exemplary embodiment of the present invention.

FIGS. 14A-14E illustrate an operation of the structured outline handwriting guide 1300 according to an exemplary embodiment of the present invention. Beginning in FIG. 14A, a user has provided handwriting 1402 on a first level of the structured outline. Additionally, the user has provided handwriting 1404 on a second level of the structured outline. As the user hovers the stylus 255 over the tablet 250, the structured outline handwriting guide 1300 appears. As shown in FIG. 14A, the user hovers the stylus 255 over the first level region 1303. Accordingly, the bullet region 1306 and the indicator 1304 are presented to guide the user in the structured outline.

Figure 14B:
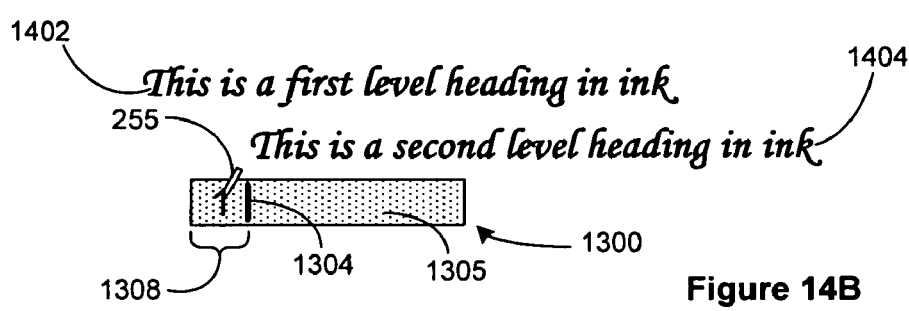

In FIG. 14B, the user hovers the stylus 255 over the second level bullet region 1308 to produce a lightly shaded bullet or number for the second level region 1305. Thus, hovering the stylus 255 within the second level bullet region 1308, to the left of the indent indicator 1304, causes the second level bullet writing guide to appear and moves the indent level of the writing guide to the next level.

Figure 14C:
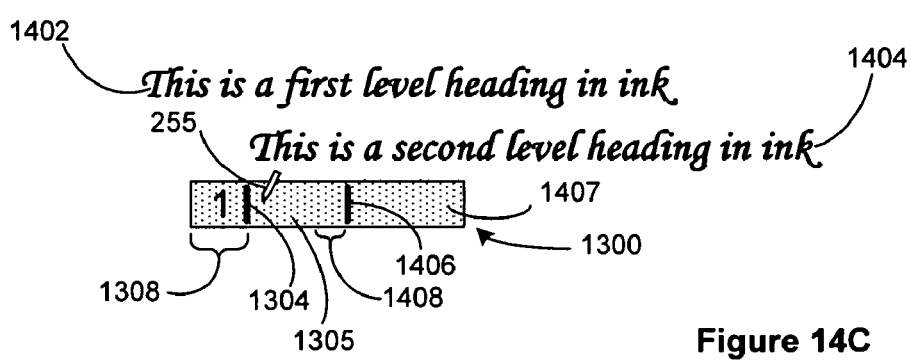

In FIG. 14C, the user hovers the stylus 255 over the second level region 1305. At that time, a third level indicator 1406 is displayed to show the location of a third level region 1407. A third level bullet region 1408 also is provided for the third level region 1407.

Figure 14D:
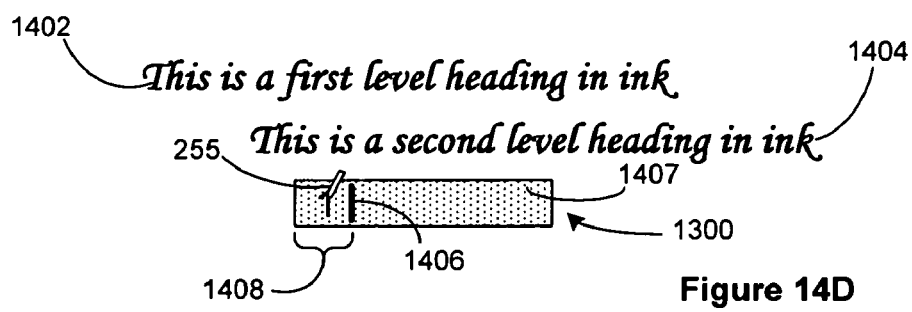

In FIG. 14D, the user hovers the stylus 255 over the third level bullet region 1408 to produce a lightly shaded bullet or number for the third level region 1407.

Figure 14E:
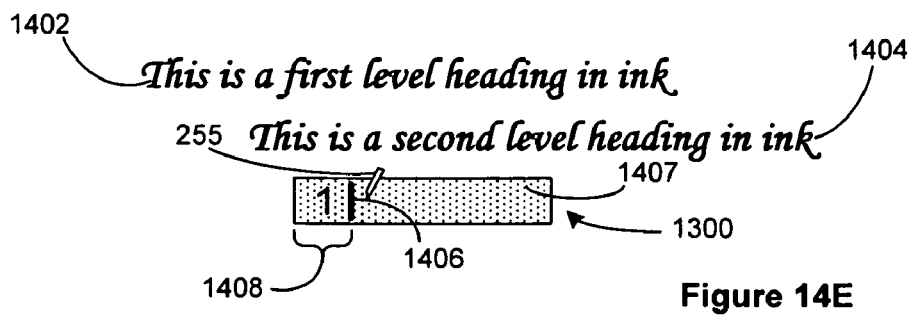

In FIG. 14E, the user hovers the stylus 255 over the third level region 1407 and can begin writing to provide text in the third level of the structured outline.

Figure 15:
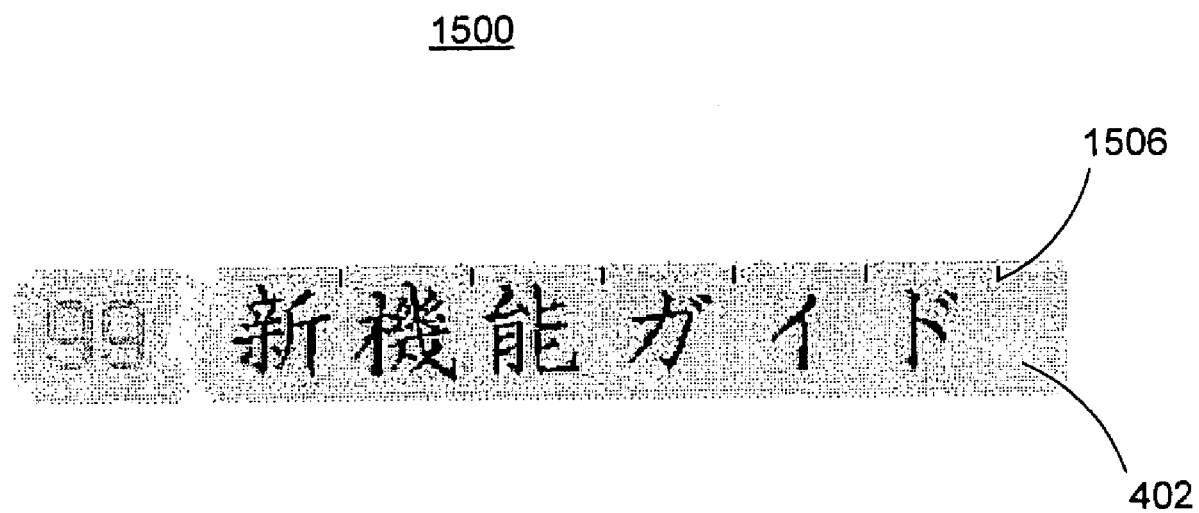
FIG. 15 illustrates a language handwriting guide for languages without spaces between their characters according to an exemplary embodiment of the present invention.

FIG. 15 illustrates a language handwriting guide 1500 for languages without spaces between their characters according to an exemplary embodiment of the present invention. The language handwriting guide 1500 comprises the writing area 402. Additionally, the language handwriting guide 1500 comprises character notches 1506 in the writing area 402. The character notches 1506 provide a character box in the writing area, 402 into which a single character from a particular language can be written. Accordingly, the character notches 1506 divide the languages into their basic characters as the user writes the characters into separate character boxes. Accordingly, the handwriting guide 1500 can provide word breaking for the text recognition module 235, thereby improving the accuracy of the text recognition process for languages without spaces between their characters. Japanese is an example of such a language.

In an exemplary embodiment, the language handwriting guide 1500 can be presented as discussed above with reference to FIG. 3. Accordingly, a certain amount of ink may be provided on the tablet 250 before the full language handwriting guide is presented. Ink input before presentation of the language handwriting guide having the character notches can be marked as "word breaking needed." That marking can inform the text recognition module 235 that characters within the initial ink have not been separated.

Figure 16:
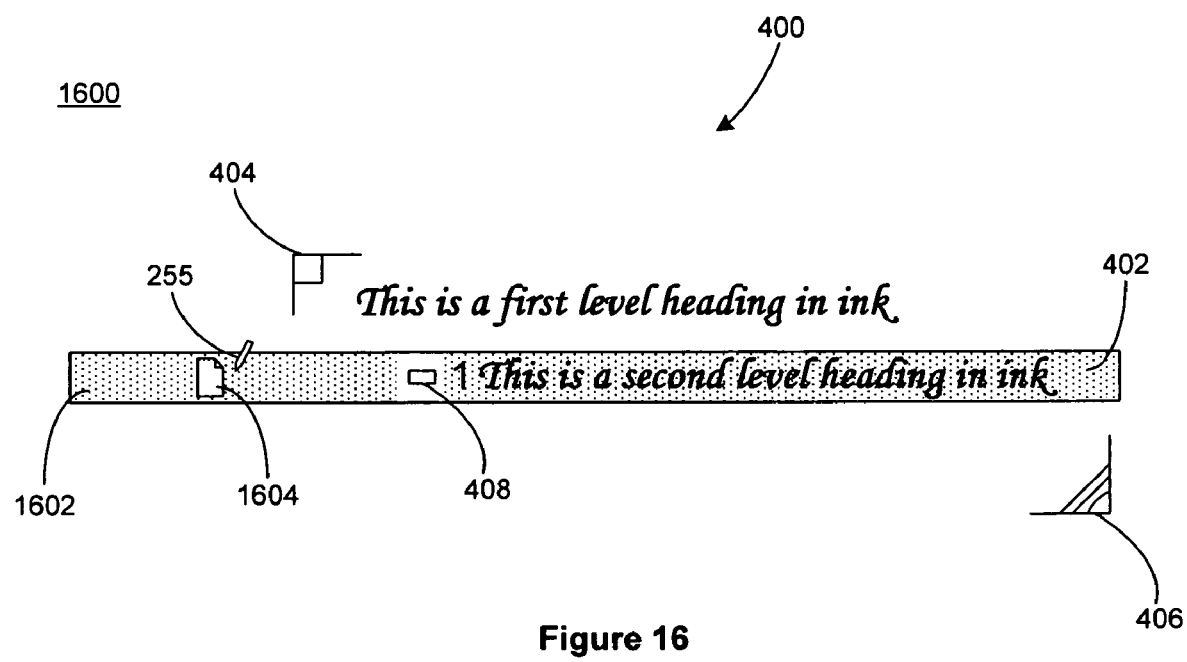
FIG. 16 illustrates a gesture handwriting guide according to an exemplary embodiment of the present invention.

FIG. 16 illustrates a gesture handwriting guide 1602 according to an exemplary embodiment of the present invention. As shown, the gesture handwriting guide 1602 can be combined with the handwriting guide 400 described above. The gesture handwriting guide 1602 provides a holding area for one or more icons 1604. Each icon 1604 represents an action for application to handwriting provided in the writing area 402 of the writing guide 400. For example, actions associated with an icon 1604 can comprise highlight, bold, underline, and e-mail. Accordingly, selection of the icon 1604 can execute the action associated with that icon 1604. For example, selecting a highlight icon can cause all handwriting in the writing area 402 to become highlighted. As another example, selecting an e-mail icon can cause the handwriting in the writing area 402 to be attached to an e-mail for sending to another party.

Figure 17:
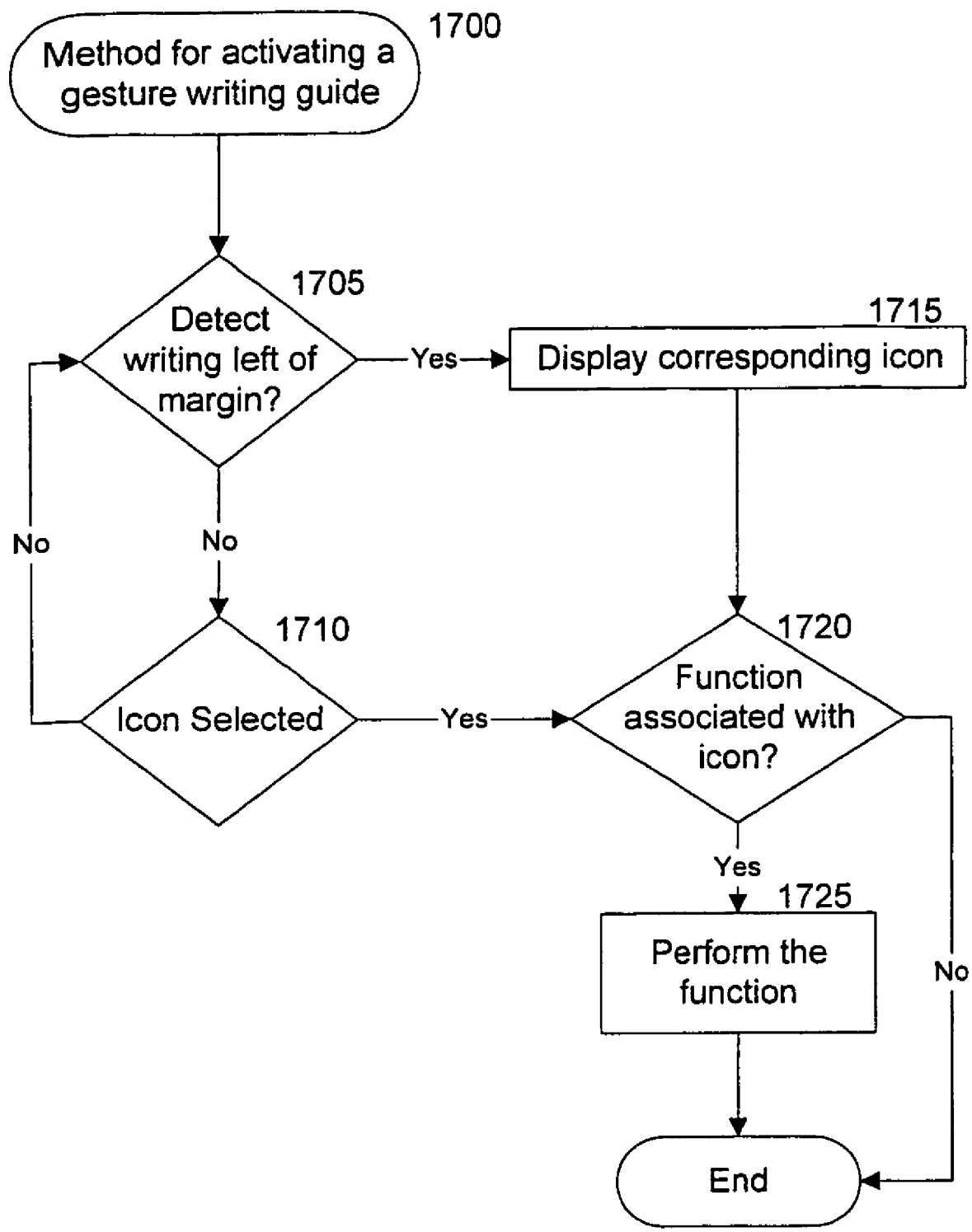
FIG. 17 is a flow chart depicting a method for activating a gesture handwriting guide according to an exemplary embodiment of the present invention.

An exemplary method 1700 for activating a gesture handwriting guide will now be described with reference to FIGS. 16 and 17. FIG. 17 is a flow chart depicting the method 1700 for activating a gesture handwriting guide according to an exemplary embodiment of the present invention. In step 1705, the writing guide module 227 attempts to detect ink strokes in an area to the left of the left margin. For example, as shown in FIG. 16, the writing guide module 227 can attempt to detect ink strokes in the gesture handwriting guide 1602. The writing can comprise a handwritten symbol corresponding to an icon 1604. If the writing guide module 227 detects those ink strokes to the left of the left margin, then the method branches to step 1715. In step 1715, the writing guide module 227 displays the icon corresponding to the handwritten symbol. The method then proceeds to step 1720.

If the writing guide module 227 does not detect ink strokes to the left of the left margin in step 1705, then the method branches to step 1710. In step 1710, the writing guide module 227 determines whether a user has selected an icon 1604 displayed in the gesture handwriting guide 1602. If not, then the method branches back to step 1705. Accordingly, steps 1705 and 1710 are repeated until the writing guide module 227 detects writing left of the margin or selection of an icon 1604.

If the writing guide module 227 determines in step 1710 that a user has selected an icon, then the method branches to step 1720. In step 1720, the writing guide module 227 determines an action attached to the icon. Then, in step 1725, the writing guide module 227 performs the associated action.

In an alternative exemplary embodiment, the gesture handwriting guide 1602 can be omitted. In that embodiment, a user can write a symbol anywhere on the tablet 250. The symbol can have a corresponding icon with an associated action. The writing guide module 227 can recognize the symbol, display the icon, and perform the action, even though the user did not write the symbol in the gesture handwriting guide 1602.

Figure 18:
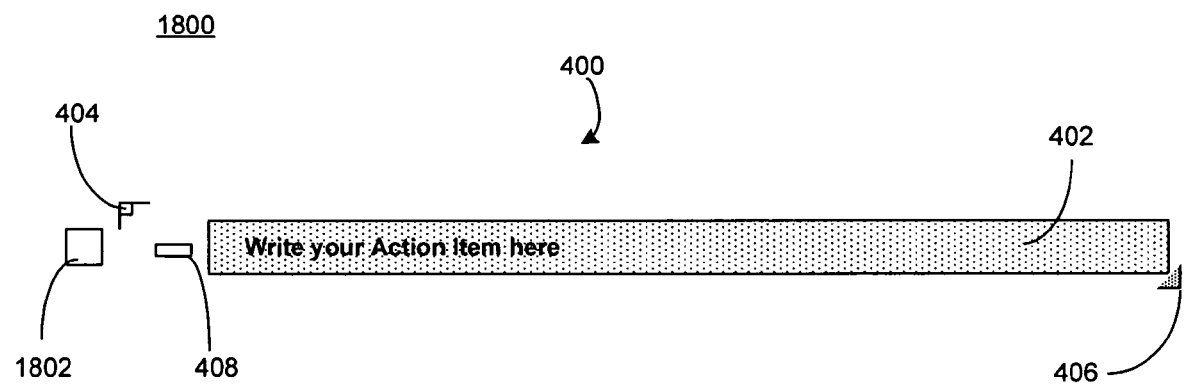
FIG. 18 illustrates a sacrificial writing guide according to an exemplary embodiment of the present invention.
Figure 19:
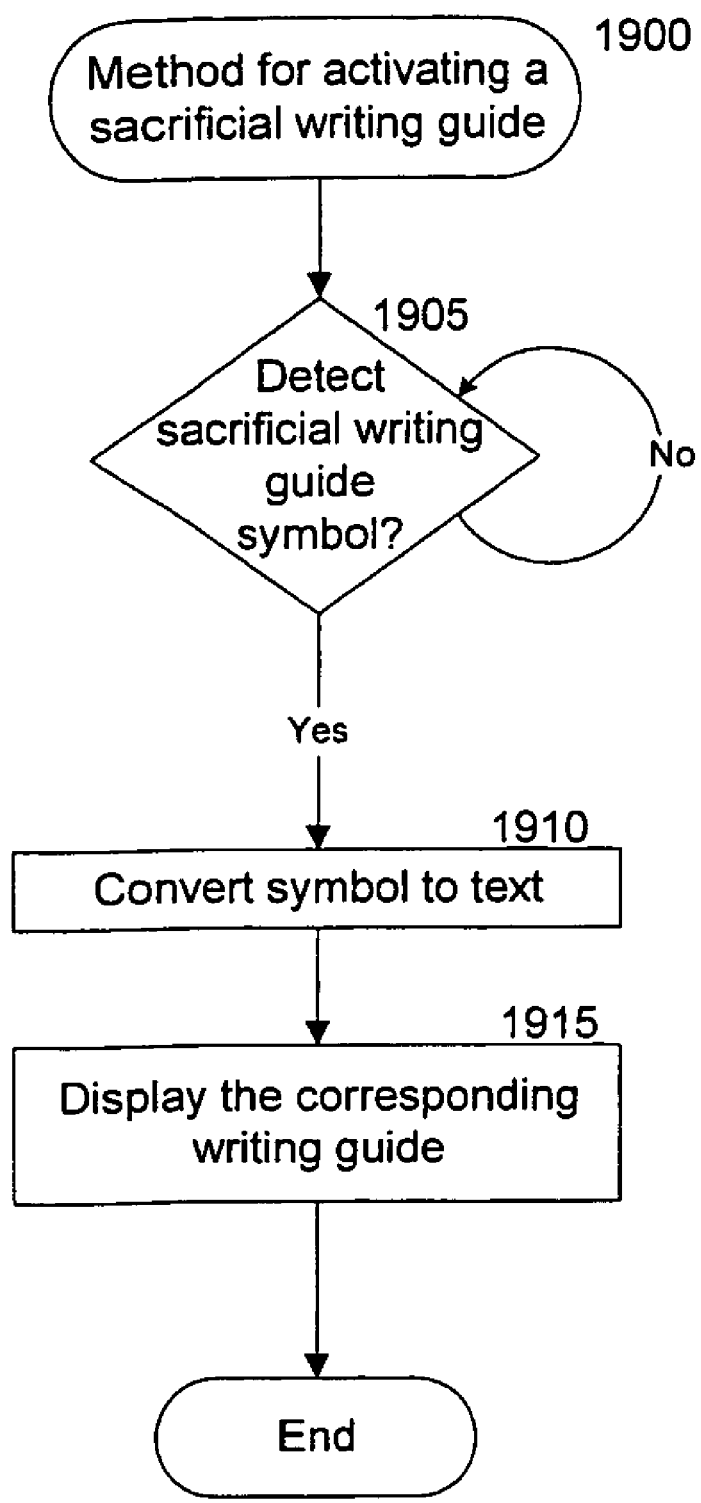
FIG. 19 is a flow chart depicting a method for activating a sacrificial writing guide according to an exemplary embodiment of the present invention.

A method 1900 for activating a sacrificial writing guide 1800 according to an exemplary embodiment of the present invention will now be described with reference to FIGS. 18 and 19. FIG. 18 illustrates the sacrificial writing guide 1800 according to the exemplary embodiment of the present invention. FIG. 19 is a flow chart depicting the method 1900 for activating a sacrificial writing guide 1800 according to an exemplary embodiment of the present invention.

As shown in FIG. 18, the sacrificial writing guide 1800 comprises a sacrificial symbol 1802 and the writing guide 400. In the exemplary embodiment of FIG. 18, the sacrificial symbol 1802 comprises a check box. Accordingly, a user can write the sacrificial symbol 1802 on the tablet 250. The writing guide module 227 can recognize the sacrificial symbol 1802 and can present the entire writing guide 1800 for the user.

In step 1905 of FIG. 19, the writing guide module 227 attempts to detect a sacrificial symbol 1802 on the tablet 250. Step 1905 is repeated until the writing guide module 227 detects the sacrificial symbol 1802. After detecting the sacrificial symbol 1802, the method branches to step 1910. In step 1910, the writing guide module 227 converts the sacrificial symbol 1802 to text. Then, in step 1915, the writing guide module 227 displays the complete writing guide 1800 corresponding to the sacrificial symbol 1802.

In the exemplary embodiment of FIG. 18, the sacrificial symbol 1802 comprises a check box. Accordingly, when the writing guide module 227 detects a handwritten symbol for a text box, the writing guide module 227 can display the complete writing guide 1800.

FIG. 20 illustrates active writing guide portions 2004, 2004a for adding handwriting to existing object elements according to an exemplary embodiment of the present invention. The writing guide portions 2004, 2004a represent active areas on the tablet 250. Each portion 2004 corresponds to an active area at the end of an existing, inactive object element 2002. For example, as shown in FIG. 20, the inactive object element "windex" is followed by an active writing guide portion 2004. If a user writes ink into the portion 2004, then the writing guide module 227 will add that ink to the corresponding object element 2002.

Thus, the writing guide portions 2004 can allow a user to go back and write into a previous line. Any word written into a writing guide portion 2004 can be considered on the corresponding writing guide and on the same line. Furthermore, the ink written into the writing guide portion 2004 can be entered before the next line in the stream of handwriting.

Additionally, writing guide portions 2004a indicate an active area for adding a new object element to an outline object. Accordingly, a user can input ink strokes into the portions 2004a to add a new line of handwriting to the outline object. Thus, a new paragraph can be started by writing on a writing guide portion 2004a of a blank line. In an exemplary embodiment, two free lines having writing guide portions 2004a are provided below a line that contains text/handwriting. The writing guide portions 2004a can become visible by hovering the stylus 255 over them. The writing guide portions can acquire an initial height from the previous writing guide in the same outline object. Alternatively, the writing guide portions can acquire the height of the first writing guide in the outline object if the previous writing guide had grown extensively. For example, if the previous writing guide had grown to be twice the initial height, then the writing guide portions can acquire the height of the first writing guide. Additionally, if the first writing guide had grown extensively from the default height, such as twice the default height or larger, then the writing guide portions can acquire that size.

FIG. 20 also illustrates adding a new outline object 2006 on the tablet 250. To add the new outline object 2006, a user can start handwriting anywhere in blank space 2008 of the tablet 250. The blank space 2008 can be any space that is not occupied by an inactive object element 2002 or a writing guide portion 2004, 2004a. In an exemplary embodiment, outline objects can be overlapped. When a user inputs ink off of a writing guide portion 2004 or a full writing guide line 2004a, the writing guide module 227 creates a new outline object 2006 that can float over an existing outline object.

Figure 21:
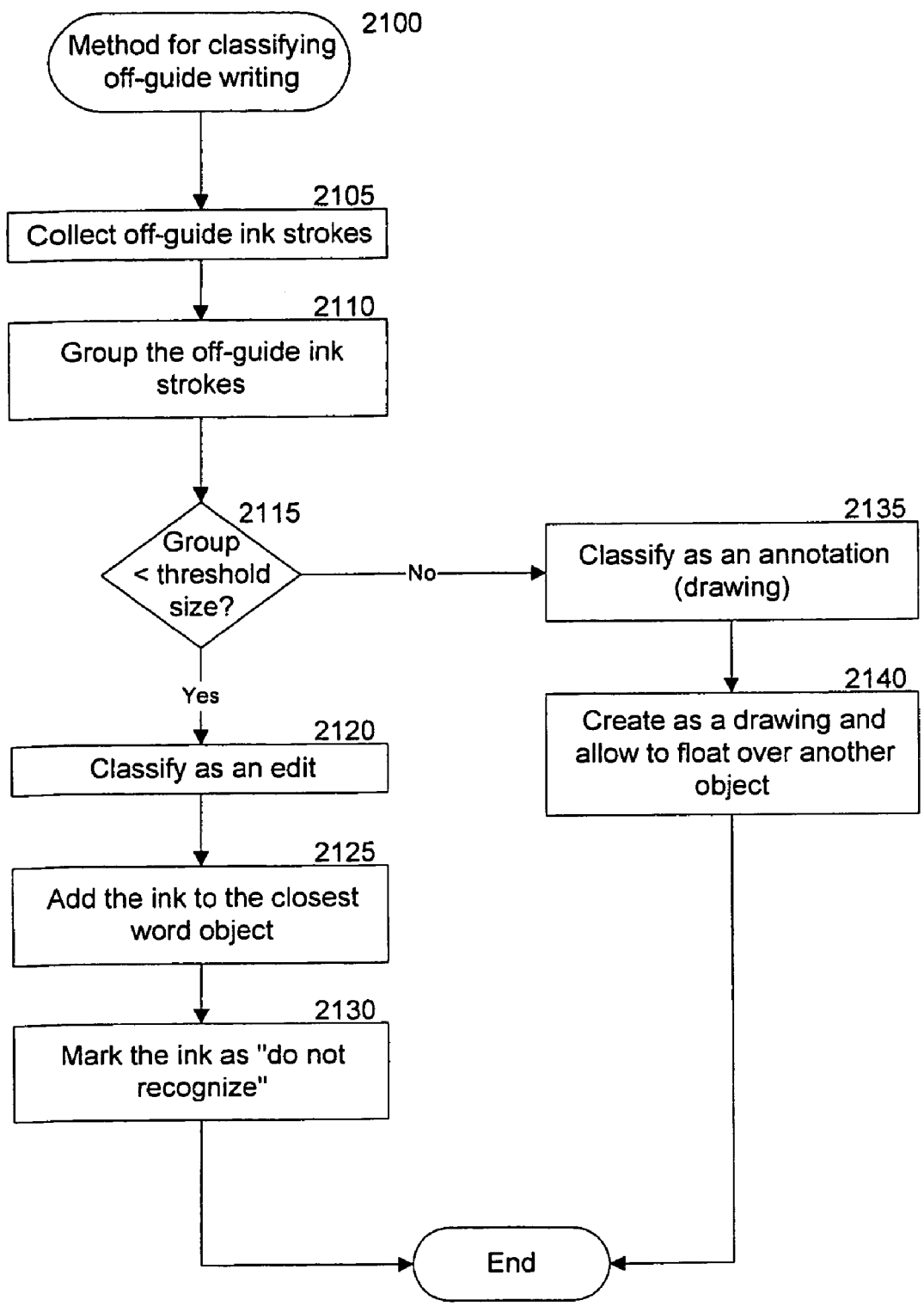
FIG. 21 is a flow chart depicting a method for classifying off-guide writing according to an exemplary embodiment of the present invention.

FIG. 21 is a flow chart depicting a method 2100 for classifying off-guide writing according to an exemplary embodiment of the present invention. The method 2100 allows the writing guide module to handle ink that is not considered structured handwriting writing or drawings.

In step 2105, the writing guide module 227 collects off-guide ink strokes provided on the tablet 250. Off guide ink stokes comprise any ink stroke that is not in an active portion 2004, 2004a (FIG. 20). The writing guide module 227 can extract information from the ink data as the off-guide ink strokes are collected in step 2105. For example, the data can comprise a time stamp and positional information for each ink stroke. The writing guide module 227 then groups the ink strokes in step 2110 based on the extracted information. For example, strokes can be grouped together if they are created within a predetermined time frame of each other, or within a predetermined distance from each other. Each subsequent stroke meeting the above criteria can be added to the group. When the user inputs a stroke that fails the criteria, the writing guide module 227 begins a new group.

In an exemplary embodiment, the predetermined time frame and distance can comprise three-fourths of a second and one-half inch, respectively. Other time frames or distances are within the scope of the present invention.

In step 2115, the writing guide module 227 determines whether the size of the grouped strokes is less than a predetermined threshold size. Based on that determination, the writing guide module 227 can classify the off-guide ink as either an edit (step 2120) or an annotation (step 2135).

Figure 22A:
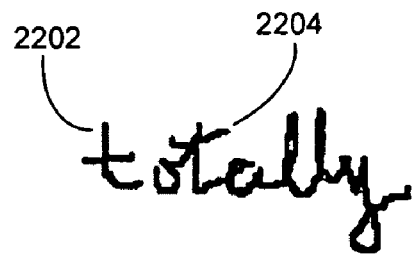
FIG. 22A illustrates an off-guide ink stroke representing an edit according to an exemplary embodiment of the present invention.

An ink edit is typically a few very short strokes, like crossing a "t" or dotting an "i." For example, FIG. 22A illustrates an ink stroke 2204 added to the object element 2202. The stroke 2204 comprises crossing the "t" in the object element 2202. Because the size of the stroke 2204 is below the threshold size, the writing guide module 227 classifies the stroke 2204 as an edit. In an exemplary embodiment, the threshold size can be the height h (FIG. 7A) or H (FIG. 7B) of the writing guide. Accordingly, if the off-guide ink stroke(s) fit into a box having a size of h by h (or H by H), then the stroke(s) comprise an edit.

Thus, if the ink size is less than the predetermined threshold, then the writing guide module 227 classifies the group of strokes as an edit in step 2120. In step 2125, the writing guide module 227 adds the grouped ink strokes to the closest word object. Then, in step 2130, the writing guide module 227 marks the added ink as "do not recognize."

Referring back to step 2115, if the grouped ink strokes exceed the predetermined threshold size, then the method branches to step 2135. In step 2135, the writing guide module 227 classifies the grouped ink strokes as an annotation.

Figure 22B:
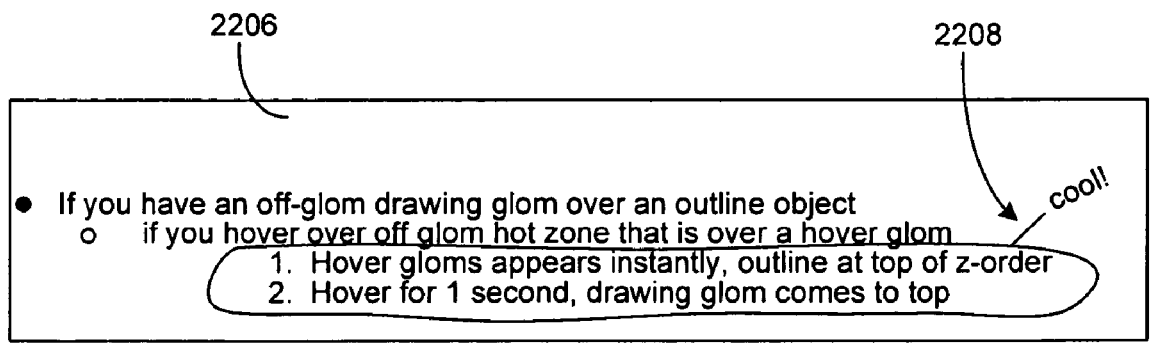
FIG. 22B illustrates a group of off-guide ink strokes representing an annotation according to an exemplary embodiment of the present invention.

Accordingly, the writing guide module 227 can classify off-guide ink having a size larger than the predetermined threshold as an annotation. After receiving enough ink to classify the ink group as an annotation, the writing guide module 227 can provide a drawing writing guide. Thus, in step 2140, the writing guide module 227 creates a drawing for the grouped strokes. The drawing writing guide can float over the underlying outline object. For example, FIG. 22B illustrates a group of off-guide ink strokes 2208 representing an annotation according to an exemplary embodiment of the present invention. The writing guide module classifies the ink strokes 2208 of FIG. 22B as an annotation. The ink strokes 2208 can comprise a drawing floating over the outline object 2206. In an exemplary embodiment, the annotation can be anchored to the node or object that it is written over. Accordingly, the items can move around on the page together.

Figure 23A:
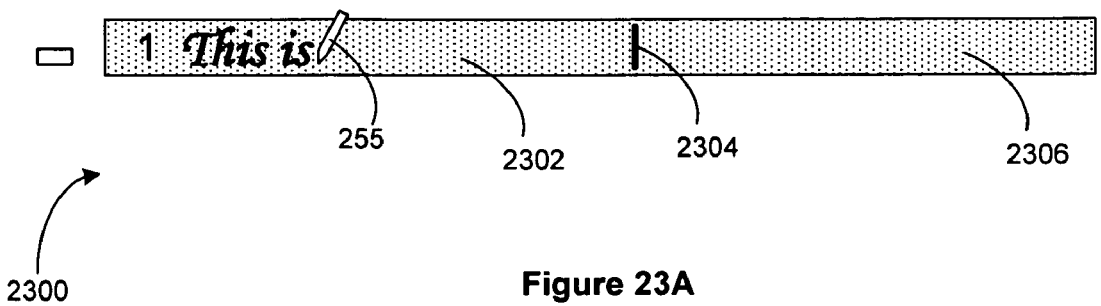
FIGS. 23A and 23B illustrate a nested heading writing guide according to an exemplary embodiment of the present invention.
Figure 23B:
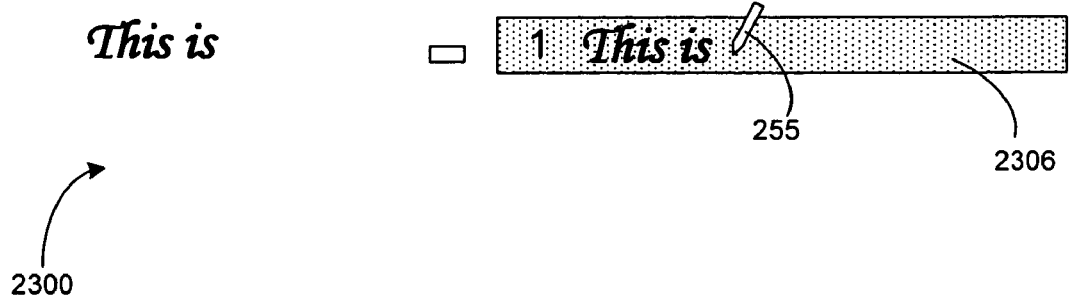

FIGS. 23A and 23B illustrate a nested heading writing guide 2300 according to an exemplary embodiment of the present invention. After a writing guide 2300 has been extended to full length, and the user has written handwriting into it, an indicator 2304 appears to indicate the beginning of a nested heading. As shown in FIG. 23A, the indicator 2304 divides the writing guide 2300 into a first heading region 2302 and a second heading region 2306. Writing into the first heading region 2302 places ink into that region. As shown in FIG. 23B, writing into the second heading region 2304 places ink into that region, thereby creating the nested headings.

Figure 24:
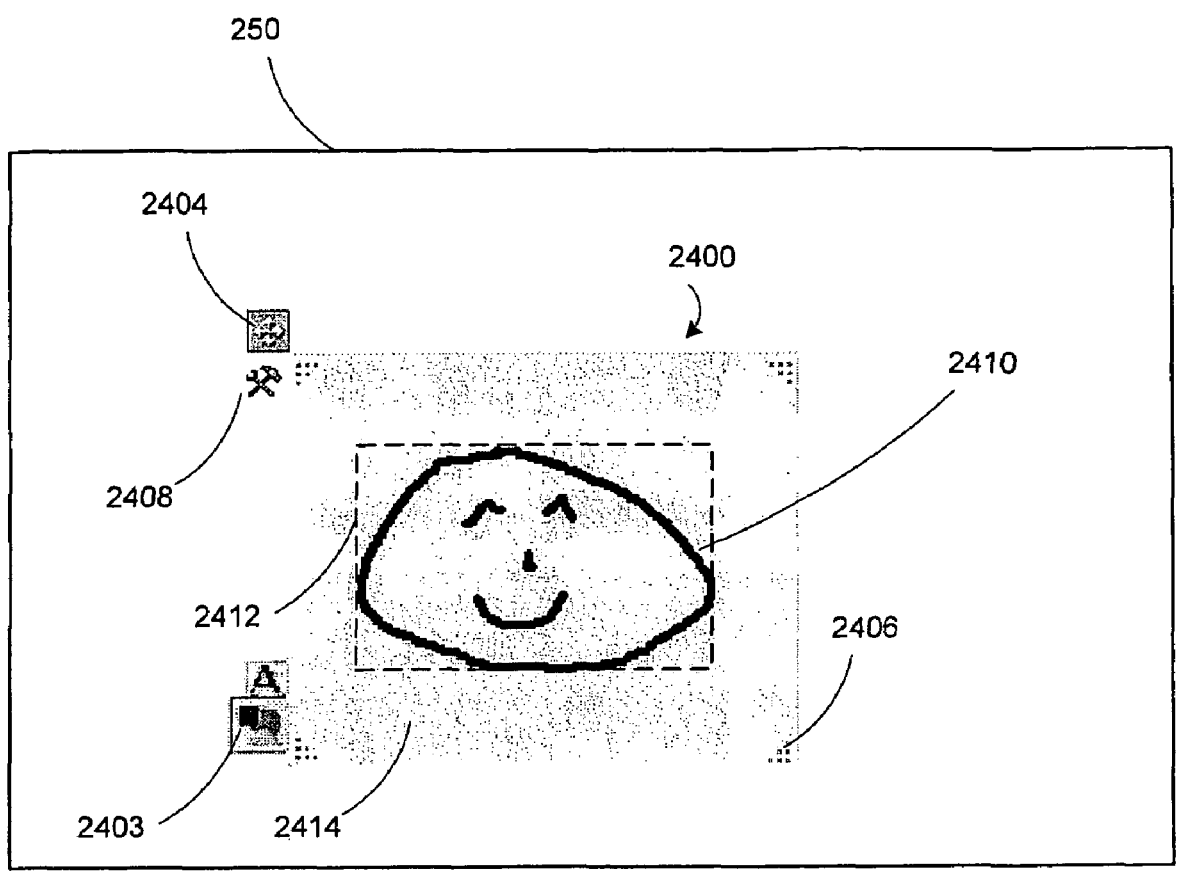
FIG. 24 illustrates a drawing writing guide according to an exemplary embodiment of the present invention.

FIG. 24 illustrates a drawing writing guide 2400 according to an exemplary embodiment of the present invention. As shown, the drawing guide 2400 can be created for a group of ink strokes 2410 provided on the tablet 250. The drawing symbol 2403 of the drawing guide 2400 indicates that the writing guide module 227 classified the ink strokes 2410 as a drawing.

The drawing guide 2400 also comprises resizing handles 2406. The resizing handles 2406 allow manual resizing of the drawing guide 2400. A user can resize the drawing guide 2400 by selecting and dragging one of the drawing guide resizing handles 2406. The drawing guide 2400 also comprises a move handle 2404 for relocating the entire drawing guide 2400.

A drawing tools icon 2408 provides access to a drop down menu (not shown). The drop down menu can comprise options for reclassifying the ink or for locking the drawing guide. Accordingly, the user can manually change the ink classification for a drawing or handwriting. For example, the user can select the drawing tools icon 2408 to reveal the drop down menu (not shown). The user then can select a "treat as writing" option to change the drawing classification to a handwriting classification. Additionally, the user can lock a drawing to prevent interaction with other drawings. Once locked, the drawing behaves like a regular picture such as a bitmap or jpeg picture file. A locked drawing guide cannot be merged with another drawing. To lock a drawing, the user can select the drawing tools icon 2408 to reveal the drop down menu (not shown). The user then can select a "lock drawing option."

Figure 25:
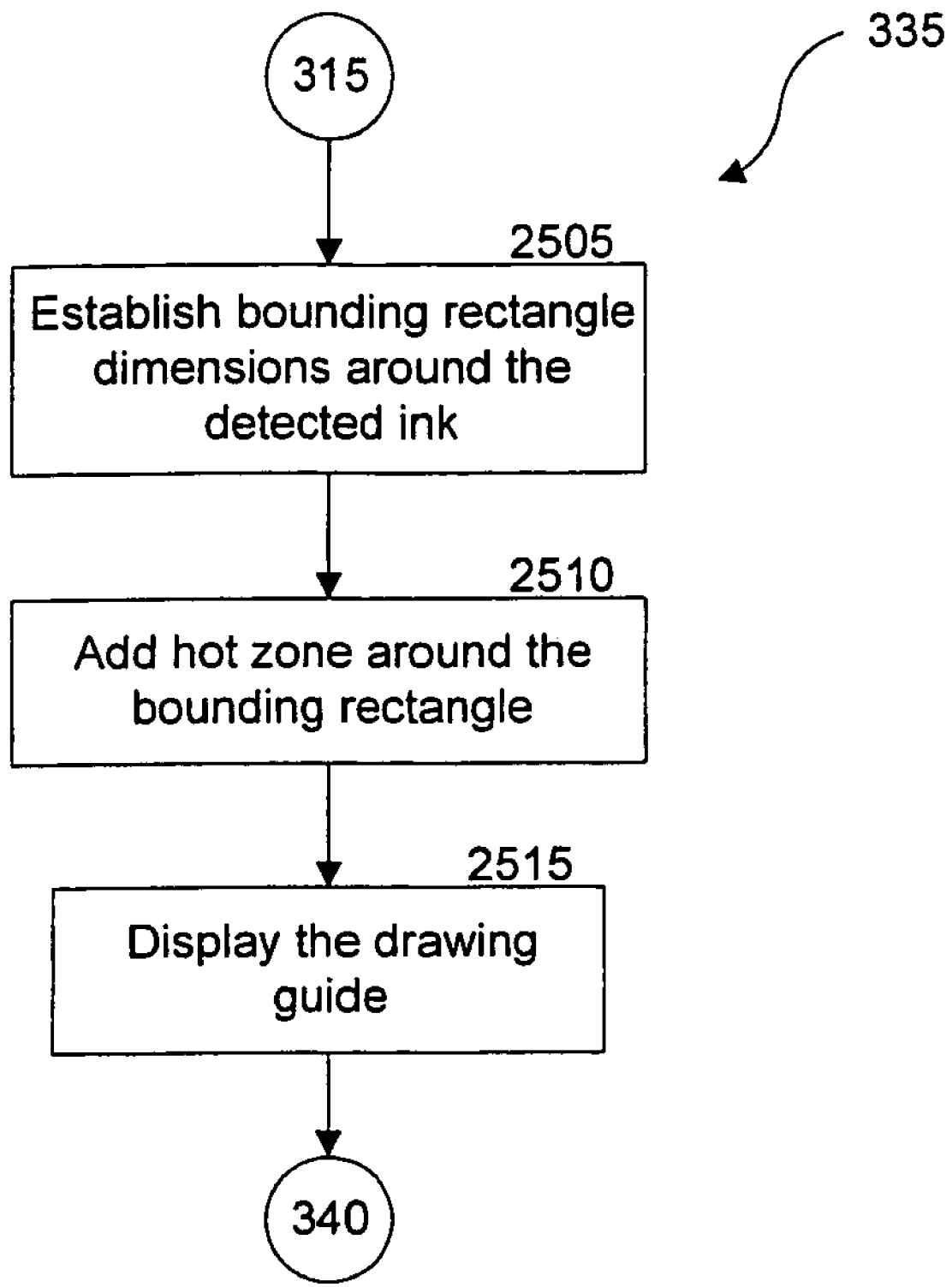
FIG. 25 illustrates a method for displaying a drawing guide according to an exemplary embodiment of the present invention.

FIG. 25 illustrates a method for displaying a drawing guide 2400 according to an exemplary embodiment of the present invention, as referred to step 335 of FIG. 3. In step 2505, the writing guide module 227 establishes a bounding rectangle 2412 around the detected ink strokes 2410. The bounding rectangle 2412 comprises a rectangle encompassing the ink strokes 2410. In step 2510, the writing guide module 227 adds a hot zone 2414 around the bounding rectangle 2412. The hot zone 2414 provides additional space in the drawing guide 2400 for a user to input new ink strokes.

In an exemplary embodiment, the hot zone 2414 can comprise a fixed boundary around the bounding rectangle 2412. In an alternative embodiment, the hot zone 2414 can comprise a buffer of a specified width surrounding each individual stroke of the detected strokes 2410. In that case, then the hot zone can have an irregular shape.

Finally, in step 2515, the writing guide module 227 displays the drawing guide 2400 having the dimensions described above on the tablet 260. The method then proceeds to step 340 (FIG. 3).

In an alternative embodiment, a drawing writing guide can be inserted initially by selecting a drawing guide from a menu. The user can make that selection using a mouse, keyboard, or stylus.

The user can deactivate a drawing guide by the following exemplary methods: (1) activation of another writing guide of any type; (2) hovering off the drawing guide for longer than one second or other predetermined time; and (3) switching modes through the toolbar or other menu.

Figure 26:
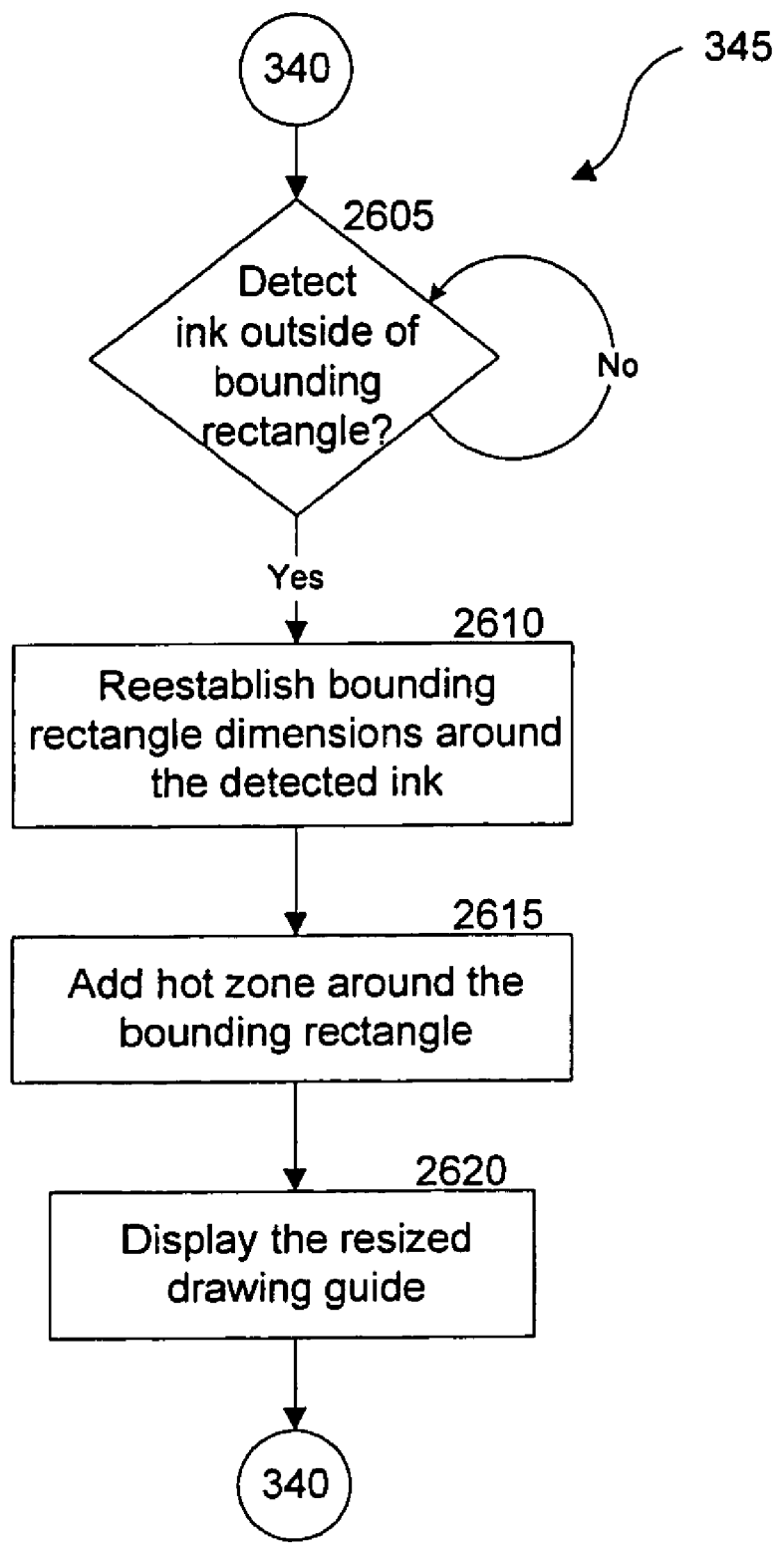
FIG. 26 is a flowchart depicting a method for recalculating drawing guide dimensions according to an exemplary embodiment of the present invention.

FIG. 26 is a flowchart depicting a method for recalculating drawing guide dimensions according to an exemplary embodiment of the present invention, as referred to in step 345 of FIG. 3. In step 2605, the writing guide module 227 attempts to detect ink outside of the bounding rectangle 2412 of the drawing guide 2400. Step 2605 can be repeated until the writing guide module 227 detects ink outside of the bounding rectangle 2412. Once ink outside of the bounding rectangle 2412 is detected, the method branches to step 2610. In step 2610, the writing guide module 227 reestablishes the bounding rectangle's 2412 dimensions to encompass the newly detected ink. In step 2615, the writing guide module 227 adds a new hot zone 2414 around the reestablished bounding rectangle 2412. Then, in step 2620, the writing guide module 227 displays the resized drawing guide 2400. The method then proceeds to step 340 (FIG. 3).

In an exemplary embodiment, the drawing guide can be extended by drawing a stroke that begins on the drawing guide and extends off drawing guide. Alternatively, the drawing guide can be extended by drawing a stroke that begins off the drawing guide and extends into a hot zone of the drawing guide. In either case, the drawing guide can be extended so that the stroke is entirely contained within the drawing guide.

In another exemplary embodiment, a user can add ink to a drawing guide even though the ink is not input into the drawing guide. In that case, the drawing guide can expand to encompass the added ink. For example, the writing guide module 227 can determine whether the added ink belongs to the writing guide based upon the time stamp and position of each added stroke. For instance, the following ink strokes can be considered part of the drawing, thereby causing the drawing guide to expand and encompass them: (1) a stroke input within one-half inch and three-fourths of a second of another stroke in the drawing guide; (2) a stroke input within two inches and one-half second of another stroke in the drawing guide; and (3) a stroke input within five inches and one-quarter second of another stroke in the drawing guide. Other time and position amounts are within the scope of the present invention.

In another exemplary embodiment, two or more drawing guides can be merged together to form one larger drawing guide. For example, if an ink stroke from one drawing guide crosses into a hot zone of another drawing guide, then the two drawings guides can be merged together. The resulting drawing guide can have the size of the bounding rectangle of the two original drawing writing guides plus a new hot zone. Merging also can be accomplished by selecting the drawing guides and selecting a merge option from a menu.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A method in a computing system of displaying a writing guide for modifying the structure of digital ink, the method comprising:
    displaying a writing guide comprising writing guide regions for structuring digital ink, each writing guide region associated with a level of a structured outline that is to be applied to digital ink written into that writing guide region;
    receiving digital ink that is entered and displayed within a writing guide region of the displayed writing guide; and
    structuring the received digital ink in accordance with the level of the structured outline associated with the writing guide region into which the digital ink was entered and re-displaying the structured digital ink.

2. The method of claim 1 wherein the writing guide regions for structuring include a bullet region corresponding to a bullet outline of the structured outline.

3. The method of claim 2 wherein the method further comprises activating the bullet region to display the bullet outline.

4. The method of claim 1 wherein the writing guide regions for structuring include a paragraph indentation control.

5. The method of claim 1 wherein the writing guide regions for structuring include a control for merging groups of related ink strokes into a single group.

6. The method of claim 5 wherein the groups are paragraphs and the control merges multiple paragraphs into a single paragraph.

7. A system of displaying a writing guide for modifying the format of digital ink, the system comprising:
    a display writing guide component configured to display a writing guide comprising a writing guide region for receiving digital ink, the writing guide region associated with a structure that is to be applied to digital ink that is written into the writing guide region;
    an adjust writing guide component configured to input a selection of an adjustment to the writing guide and in response, modify the displayed writing guide so that different writing guide regions are displayed, each writing guide region associated with a structure that is to be applied to digital ink that is written into that writing guide region;
    a receive digital ink component configured to receive digital ink that is entered and displayed within a writing guide region of the modified writing guide; and
    an apply structure component configured to structure the received digital ink in accordance with the structure associated with the writing guide region into which the digital ink was entered and to re-display the structured digital ink.

8. The system of claim 7 wherein the displayed writing guide includes a next level indent indicator dividing the writing guide into a first level region and a second level region, the first and second level regions corresponding to different levels of a structured outline.

9. The method of claim 8 wherein the writing guide region includes a bullet region corresponding to a bullet outline of the structured outline.

10. The method of claim 7 wherein a writing guide region includes a paragraph indentation control.

11. The method of claim 7 wherein the displayed writing guide includes a control for merging groups of related ink strokes into a single group.

12. The method of claim 11 wherein the groups are paragraphs and the control merges multiple paragraphs into a single paragraph.

13. A computer-readable medium containing instructions for displaying a writing guide for modifying the structure of digital ink, by a method comprising:
    displaying a writing guide comprising a writing guide region and a formatting area containing a format action indicator, the writing guide region associated with a first level of a structured outline that is to be applied to digital ink written into that writing guide region and the format action indicator associated with a format that can be applied to digital ink written into that writing guide region;
    receiving an indication to display an additional writing guide region;
    displaying the additional writing guide region as part of the displayed writing guide, the additional writing guide region associated with a second level of the structured outline;
    receiving a selection of a format action indicator of the displayed writing guide;
    receiving digital ink input by a user into a displayed writing guide region;
    associating the received digital ink with the level of the structured outline associated with the writing guide region into which the received digital ink was input and with the format associated with the selected format action indicator;
    adjusting the display of received digital ink so that it is structured in accordance with the associated level and formatted in accordance with the associated format; and wherein when the received digital ink is subsequently redisplayed it is displayed in accordance with the associated level and formatted in accordance with the associated format.

14. The computer-readable medium of claim 13 wherein the area that contains a formatting control contains multiple formatting controls.

15. The computer-readable medium of claim 13 wherein the formatting control is associated with a bold format, an underline format, or an italics format.

16. The computer-readable medium of claim 13 wherein the writing guide regions include a bullet region corresponding to a bullet outline of the structured outline.

17. The computer-readable medium of claim 13 wherein the writing guide includes a paragraph indentation control.

18. The computer-readable medium of claim 13 wherein the writing guide includes a control for merging groups of related ink strokes into a single group.

19. The computer-readable medium of claim 18 wherein the groups are paragraphs and the control merges multiple paragraphs into a single paragraph.

20. The computer-readable medium of claim 13 wherein an indication to display an additional writing guide region is received when a user hovers a pointing device over the displayed writing guide.

* * * * *